(12) United States Patent
Lalani

(10) Patent No.: US 12,472,035 B2
(45) Date of Patent: Nov. 18, 2025

(54) ORTHOPEDIC DEVICE FOR MIDFACIAL BONE STRUCTURE ADVANCEMENT

(71) Applicant: Omar Lalani, Edmonton (CA)

(72) Inventor: Omar Lalani, Edmonton (CA)

( * ) Notice: Subject to any disclaimer, the term of this patent is extended or adjusted under 35 U.S.C. 154(b) by 909 days.

(21) Appl. No.: 17/060,689

(22) Filed: Oct. 1, 2020

(65) Prior Publication Data

US 2021/0196431 A1 Jul. 1, 2021

Related U.S. Application Data

(60) Provisional application No. 62/909,793, filed on Oct. 3, 2019.

(51) Int. Cl.
| | |
|---|---|
| *A61B 17/00* | (2006.01) |
| *A61B 17/60* | (2006.01) |
| *A61B 17/62* | (2006.01) |
| *A61B 17/64* | (2006.01) |
| *A61B 17/66* | (2006.01) |
| *A61C 7/06* | (2006.01) |
| *A61C 7/12* | (2006.01) |
| *A61F 5/058* | (2006.01) |

(52) U.S. Cl.
CPC ............... *A61C 7/06* (2013.01); *A61B 17/62* (2013.01); *A61B 17/6433* (2013.01); *A61B 17/663* (2013.01); *A61C 7/12* (2013.01); *A61F 5/05891* (2013.01)

(58) Field of Classification Search
USPC ........................................ 433/19, 18, 24, 69
See application file for complete search history.

(56) References Cited

U.S. PATENT DOCUMENTS

| | | | | |
|---|---|---|---|---|
| 2,151,458 | A * | 3/1939 | Allen | A61F 5/05891 602/17 |
| 7,011,642 | B2 * | 3/2006 | Greene | A61F 5/05891 128/845 |
| 9,333,053 | B2 * | 5/2016 | Alyami | A61C 8/0096 |
| 10,426,517 | B2 * | 10/2019 | Langenfeld | A61B 17/645 |
| 2003/0056785 | A1 * | 3/2003 | Narihiko | A61F 5/56 128/206.29 |
| 2016/0184128 | A1 * | 6/2016 | Zweig | A61F 5/56 128/848 |

* cited by examiner

*Primary Examiner* — Kim M Lewis

(57) ABSTRACT

A dentofacial orthopedic device comprising a brace and a bracket. The brace is configured to be anchored to a skull with cranial anchorage assemblies. The bracket comprises first and second bracket members. The first bracket member comprises a proximal end secured by an adjuster to a receiving member of a clamp mounted to the brace. The second bracket member has a tail end hingedly connected to a distal end of the first bracket member by a joint and an anterior member configured to be rotatably anchored to an anterior portion of the skull by fasteners. The first bracket member is rotatable about the receiving member for a selective locking of the first bracket member at different angular positions relative to the second bracket member with the joint. Actuation of the adjuster causes displacement of the bracket relative to the brace.

20 Claims, 32 Drawing Sheets

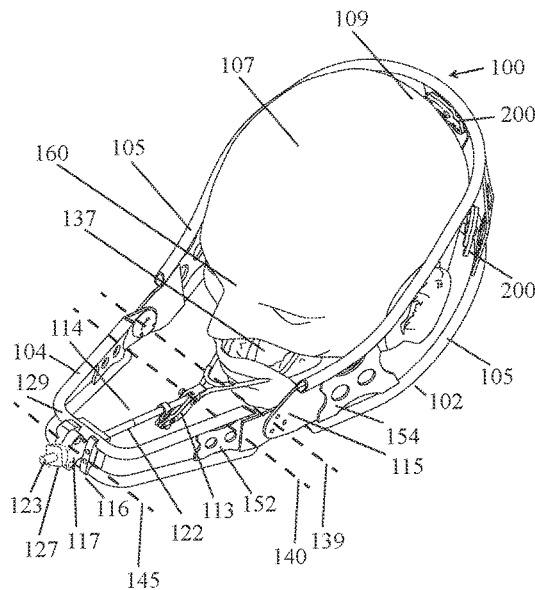

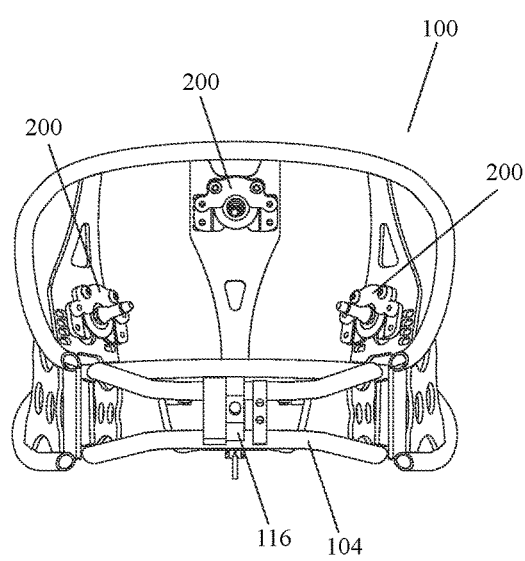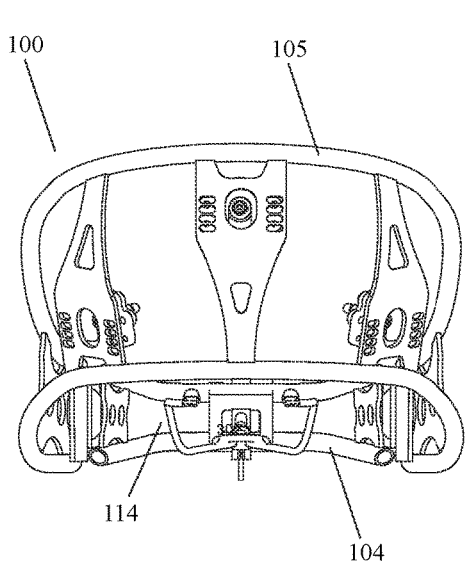
FIG. 14A
FIG. 14B

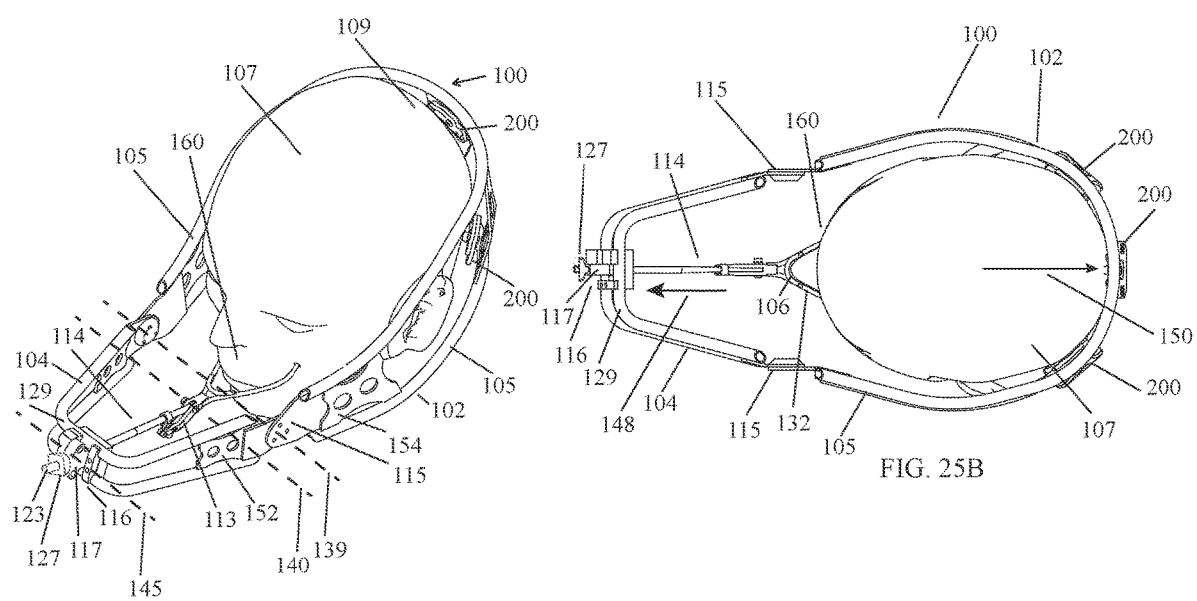
FIG. 25A
FIG. 25B
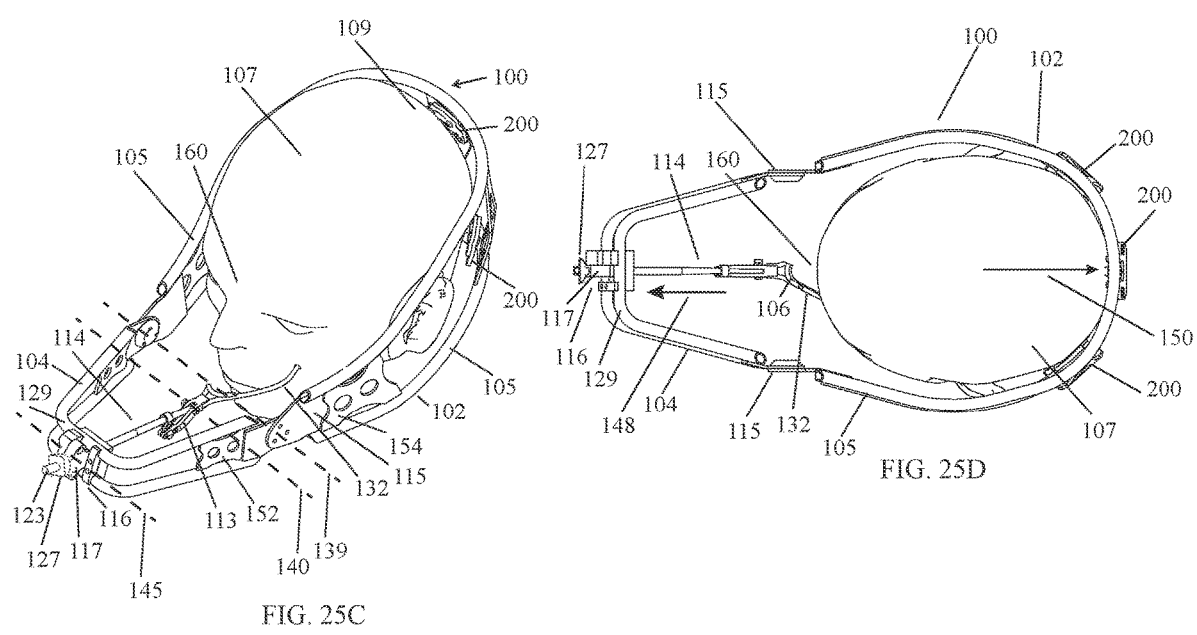
FIG. 25C
FIG. 25D

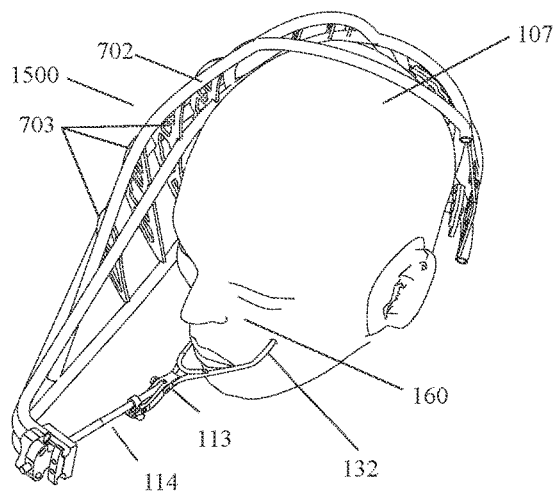
FIG. 26A
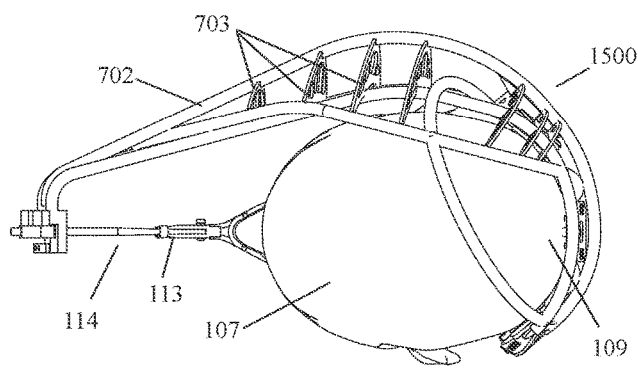
FIG. 26B
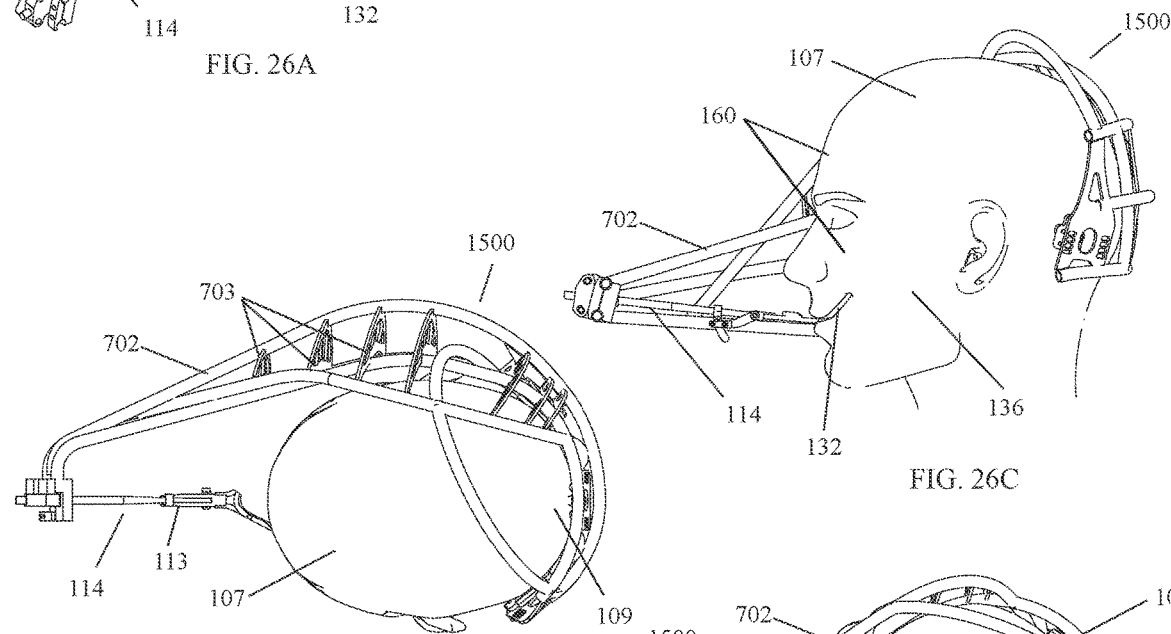
FIG. 26C
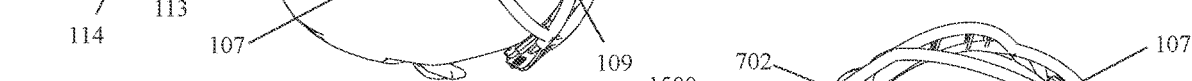
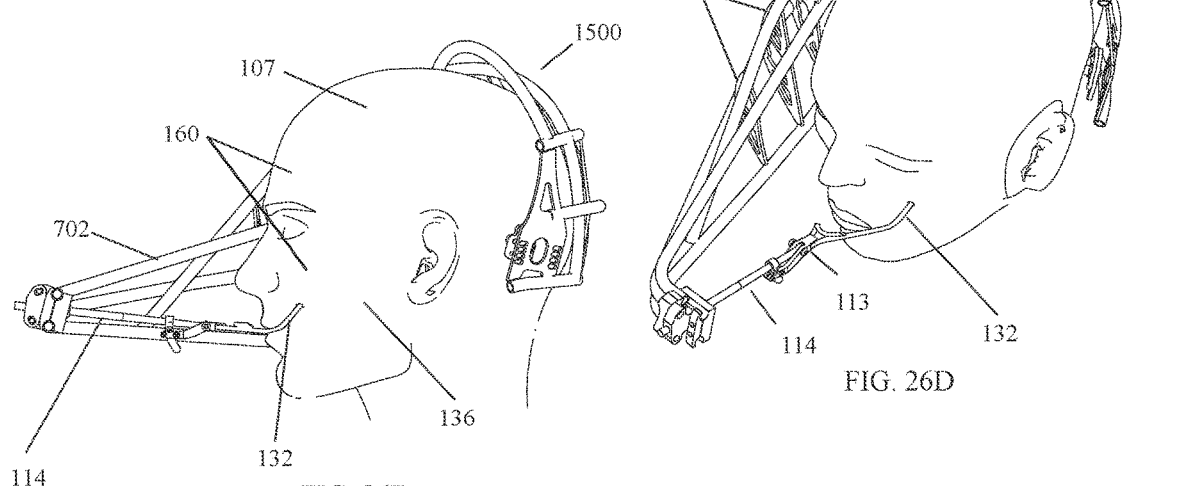
FIG. 26E
FIG. 26F
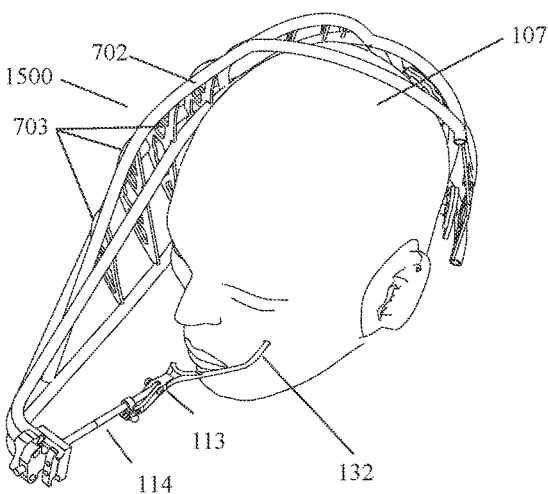
FIG. 26D

ORTHOPEDIC DEVICE FOR MIDFACIAL BONE STRUCTURE ADVANCEMENT

CROSS-REFERENCE TO RELATED APPLICATIONS

This application claims the benefit of U.S. Provisional Application No. 62/909,793, filed Oct. 3, 2019, the contents of which are incorporated herein by reference.

TECHNICAL FIELD OF THE DEVICE & METHOD

Embodiments of the present method and device described herein in general relates to an orthopedic device, particularly useful for advancing midface and maxillofacial bony structures. More particularly, the present method and device relates to a dentofacial orthopedic device anchored to a skull and midface or mid-cranial bony structure. The device is capable of exerting expansive extra-oral force antero-posteriorly across cranial structures and sutures in order to advance mid-face and maxillofacial structures.

BACKGROUND OF THE DEVICE & METHOD

Underdevelopment of the mid-face and maxilla, which is often paired with a retruded lower jaw, affects both adults and children. It can be caused by improper development of facial and oral muscles, nose breathing patters, weak tongue musculature and tongue posture. In the case of adults, this type of underdevelopment can result in postural and temporomandibular problems, not to mention the psychological side-effects of a craniofacial deformity, and worse, obstructive sleep apnea (OSA), in which the patient's airway is too small to withstand normal soft tissue collapse during sleep, and as a result, the airway cuts off at night causing a drop of oxygen levels. A significant number of children world-wide endure cranio-facial birth defects. Mid-face deficiencies are often treated surgically, whereby an antero-posteriorly deficient maxilla, or other part of the cranium, is osteotomized and advanced.

In the treatment of OSA and underdeveloped jaws, patients often undergo double jaw surgery, in which both the upper and lower jaw are resected and moved forward, then fastened into place with screws and plates. Known in the art are the risks of relapse and injury to neurovascular structures.

Another drawback of current surgical approaches is that for people with OSA, surgical resection followed by advancement of the maxilla does not allow for multiple discrete advancements of the maxilla to optimize patency. In some surgical cases, the maximum surgical advancement in one attempt may not be enough to cure the OSA, due to limits on stretching soft tissues at once.

While double jaw surgery can advance the upper and lower jaw, it does not fully solve problems related to underdevelopment of the cranium. More specifically, there are patients with underdevelopment of the entire mid-face and/or cranium. Such patients may not only exhibit posteriorly positioned maxillae, but also underdeveloped eye sockets, incorrectly positioned sphenoid bones, compressed sinus cavities, retruded cranial foramina with reduced opening size, and possible unusual pressure on nerves from compressed bones.

The current surgical solution of cutting and segmenting individual bony segments to advance them forward does not address the above mentioned and other effects of generalized mid-face and cranial underdevelopment.

Prior art with patents application Nos. 20170312053, 20060029899 and 20050244769 describe maxillary and mid-face advancement appliances. These appliances rely on heavy elastics to deliver the pulling force against the maxilla, such elastics which may not be able to apply enough force in discrete intervals to separate cranial sutures. As well, these appliances rely on applying counter-pressure on other structures on the anterior side of the skull to pull against the maxilla, such as the forehead and the chin, and these structures may be adversely affected from such pressure. Therefore, there exists a need for a maxillary and mid-face advancement appliance that does not rely on elastics, nor on putting counter pressure on anterior structures of the skull and face.

OVERVIEW OF THE INVENTION

To address the limitations of existing techniques, there is a need for a mid-facial advancement method that allows for multiple discrete advancement steps that put minimal stretching loads on soft tissues at once to reduce the risk of relapse and increase the advancement distance potential of the maxilla, that applies a ubiquitous antero-posterior force across the entire cranium in order to decompress internal structures that were previously compressed or underdeveloped, that does not require surgical detachment and reattachment of bony structures, hence reducing the risk of neurovascular injuries, that does not rely on elastics to deliver force, and that does not require the use of counter-force against other structures that are at the anterior region of the skull, such as the forehead and chin.

The proposed device and method addresses the above problems by applying a controlled and general expansive force between the back of the head and the maxilla without the use of bony cuts and segmentations, such force that will extend through other cranial bone and neurovascular structures that may also be underdeveloped. This approach may address the above-mentioned issues of underdeveloped eye sockets, incorrectly positioned sphenoid bones, compressed sinus cavities, retruded cranial foramina with reduced opening size along with reduced cranial blood flow and unusual pressure on nerves, including others.

The proposed device applies discrete and gradual displacement force at regular intervals across cranial sutures, expanding them and stretching the soft tissues over a gradual period, potentially increasing the physiologically tolerable advancement distance. For OSA patients, this allows for periodic testing of the airway patency, as the mid-face is being advanced, giving the practitioner the knowledge of when to stop advancement.

Various embodiments of the present subject matter are applicable for various applications. One embodiment of the present subject matter is configured to be used as a dentofacial orthopedic device.

Embodiments of the present device and method described herein in general relates to a dentofacial orthopedic device, particularly useful for advancing midfacial bony structures. More particularly, the present device and method relates to a bone anchored dentofacial orthopedic device with one end anchored to the skull and other end anchored to the midface, either by a tooth-borne or bone-anchored appliance. The dentofacial orthopedic device, referred as to the device hereinafter, is capable of exerting expansive extra-oral force antero-posteriorly across the anchored points on the skulls and the mid-face or mid-cranium. The device is useful in particular, but not limited to, advancing mid-face and cranial maxillofacial structures.

According to one feature of the present embodiment, a brace is screwed to the skull (occipital region, for example) through one or more cranial anchorage assemblies, with or without subcutaneous plates. The location of the cranial anchorage assemblies is optimized for skull thickness and force alignment.

The brace is contoured to the shape of the skull, which wraps around the front of the skull, forming a ring-shaped loop around the mouth that terminates full circle in front of the mouth. At the mouth-end of the brace, there is a clamp for an proximal end of the bracket that can be retracted or advanced by turning a nut. The proximal end is part of an orthodontic bracket which has an anterior member connected to the opposite side of the proximal end. The orthodontic bracket is a rigid mouth piece which is either tooth-borne or bone-anchored intra orally into the maxilla, the zygoma, or extra-orally through skin penetrations onto another bony structure that needs to be moved. Therefore, by turning the nut at the mouth end of the brace, or on which ever location on the brace the adjuster nut is placed, the proximal end can be advanced and will pull forward against the bony structures that need to be advanced or relocated. Turning the nut creates displacement forces that will be translated to the back of the skull where the brace is attached by the aforementioned screws and plates. The brace can be split in half, whereby there is a brace only for the left side of the cranium, or one for the right side of the cranium.

The clamp disposed at the front brace segment of the brace, located at the anterior region of the skull (at the front of the mouth, for example), is fitted to the brace via a hinge and the clamp can be selectively mounted to any section of a mounting portion of the front brace segment. The clamp is provided to host the proximal end that can be angulated to suite the desired direction of motion of maxillary or bony structure advancement. The proximal end is fitted in the clamp in at a predetermined position. The position can be determined based on the midfacial bone structure, geometry of the midfacial bone, and amount of displacement force required. During a course of midfacial advancement, the screw position can be changed according to the achieved target of advancement and the expected course of the advancement.

The orthodontic bracket is configured to be angulated such that at any angle of advancement, the center of rotation is external to the opening of the patient's mouth. This configuration ensures that the mouth can be sealed at any given angle of advancement. The center of rotation is the place where the proximal end is fitted. By tilting the clamp, the orthodontic bracket can be angulated. Based on the desired direction of the displacement force application, the nut can be rotated in clock wise or anti clockwise direction.

The materials of the brace can be any biocompatible rigid or semi-rigid material.

The device may be designed by a person or an artificially intelligent software program. The device requires a planning stage, which would normally be undertaken by an oral surgeon, such stage which involves cephalometric and CT-Scan analysis, which takes into account the current position of the bones of the skull, and the desired position of those bones as determined by the patient and the practitioner. The path of movement and displacement of the mid-face is determined, and accordingly the device is designed to follow that path. Over the course of the treatment period, the angular or linear displacement of the device is achieved that results in movement of the bony structure per the results of the planning stage. Optimizing the placement of one or more anchorage assemblies at the back of the skull and intraorally can be done using computer assisted surgery.

The expansive extra-oral force across the cranium regions separates cranial sutures, eventually pushing the midface forward.

BRIEF DESCRIPTION OF THE DRAWINGS

A better understanding of embodiments of the present disclosure (including alternatives and/or variations thereof) may be obtained with reference to the detailed description of the embodiments along with the following drawings, in which:

FIGS. 11A-11C illustrate a perspective view, a top view and a side view respectively of a two-part full-brace, intra-oral dual-arm full-bracket type of an embodiment of the dentofacial orthopedic device in use;

FIGS. 11D-11E illustrate a perspective view and a top view respectively of a full-brace, intra-oral single-arm half-bracket type of an embodiment of the dentofacial orthopedic device;

FIGS. 14A and 14B illustrate front view and rear view of the two-part full-brace, dual-arm full-bracket type of the dentofacial orthopedic device respectively;

FIGS. 25A and 25B illustrate a perspective view and a top view of another embodiment of the present invention having a full-brace, dual-arm bracket configured to access the anterior portion of the skull extra-orally;

FIGS. 25C and 25D illustrate a perspective view and a top view of another embodiment of the present invention having a full-brace, single-arm bracket configured to access the anterior portion of the skull extra-orally;

FIGS. 26A-26C illustrate a perspective view, a top view and a side view of another embodiment of the present invention having a single-piece half-brace, dual-arm bracket configured to access the anterior portion of the skull extra-orally;

FIGS. 26D-26F illustrate a perspective view, a top view and a side view of another embodiment of the present invention having a single-piece half-brace, single-arm bracket configured to access the anterior portion of the skull extra-orally;

DETAILED DESCRIPTION

Embodiments and features of the present invention are described herein; however, it is to be understood that the disclosed embodiments are merely exemplary of the invention that may be embodied in various and alternative forms.

Figure 1A:
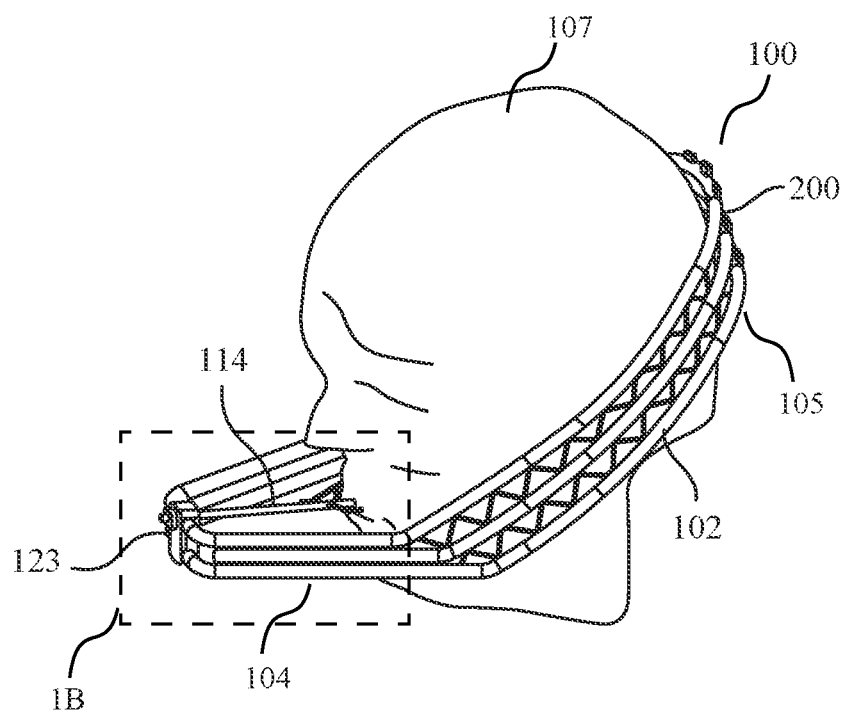
FIG. 1A is a perspective view of generic structure of a dentofacial orthopedic device (100) anchored to a skull, in accordance with a preferred embodiment of the present disclosure.
Figure 20A:
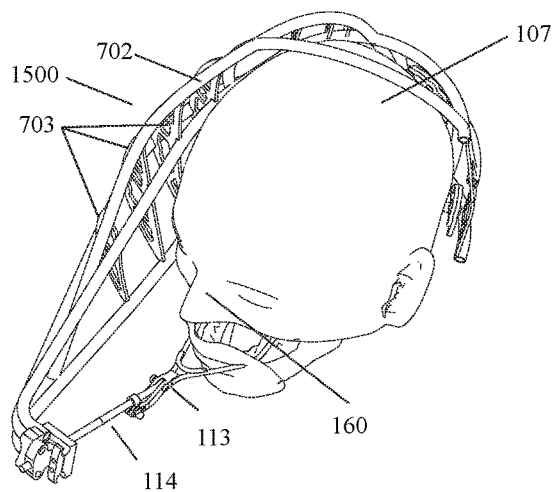
FIGS. 20A-20C show a perspective view, a top view and a side view of a one-piece half-brace, dual-arm bracket type of embodiment of the present invention in use.
Figure 20B:
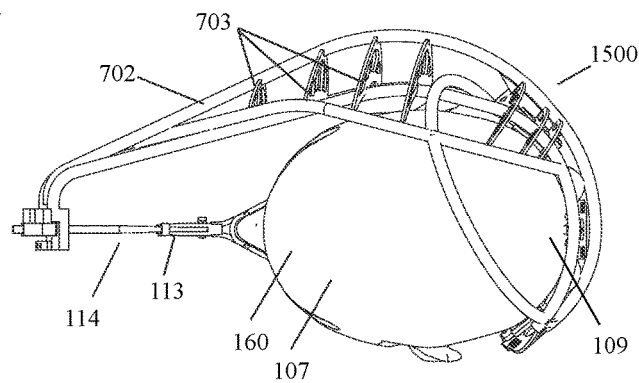
Figure 20C:
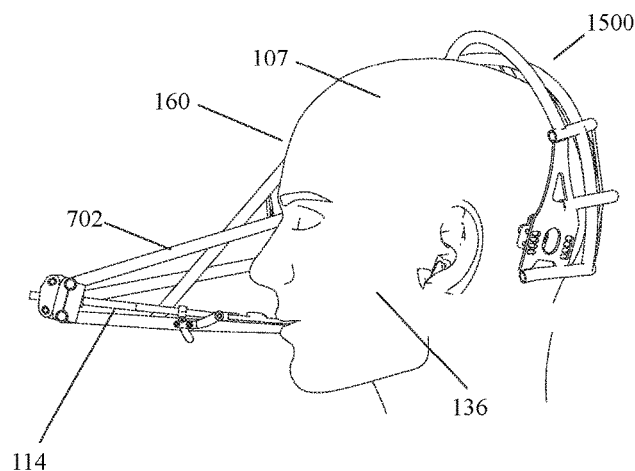
Figure 20D:
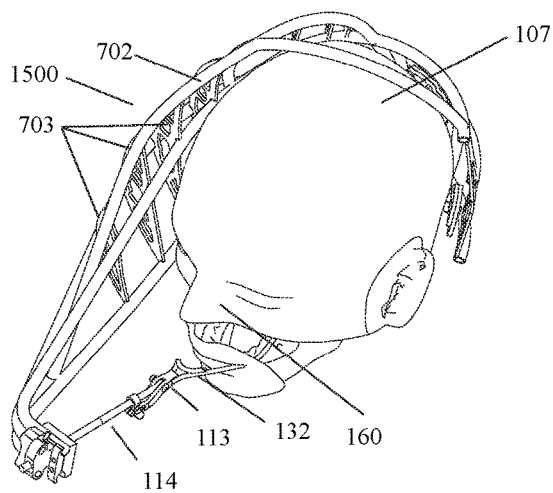
FIGS. 20D-20E, 21A-21B illustrate a perspective view, a top view, a front view and a rear view of a one-piece half-brace, single-arm bracket type of embodiment of the present invention in use.
Figure 20E:
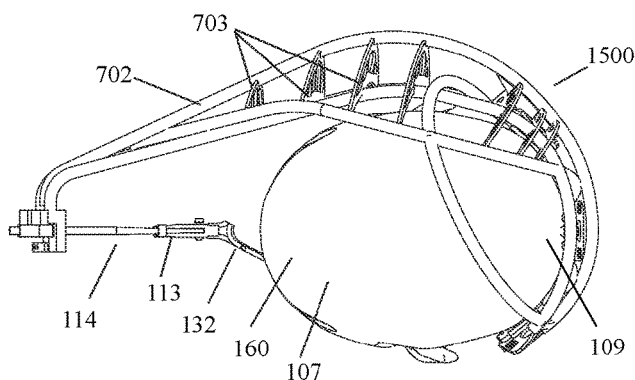
Figure 21A:
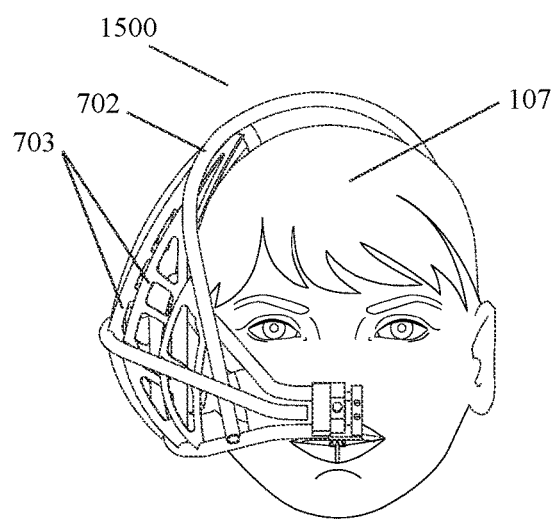
Figure 21B:
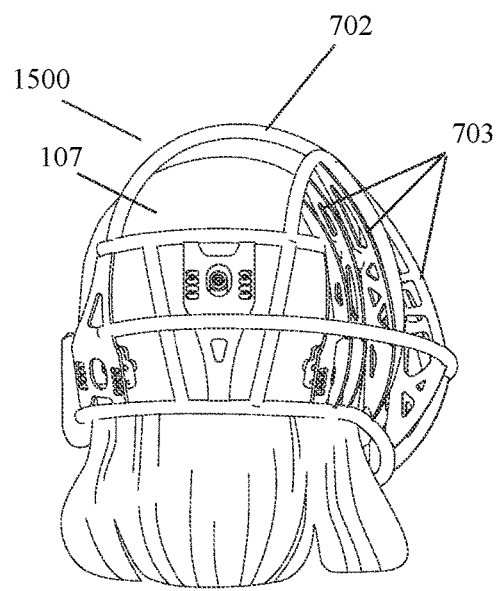
Figure 22A:
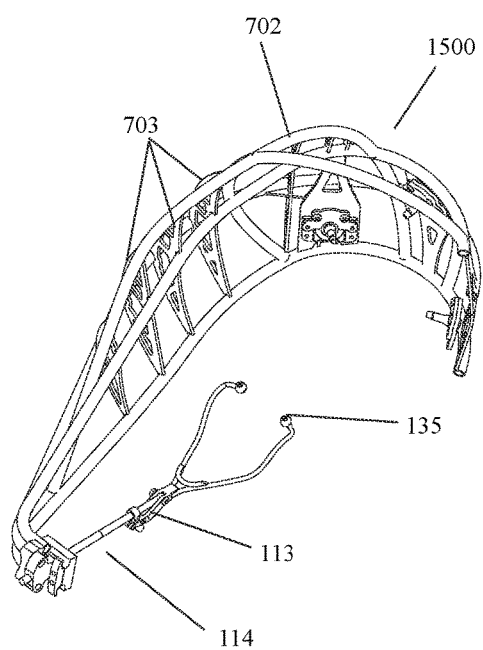
FIGS. 22A-22C, 23A-23B show a perspective view, a top view, a side view, a front view and a rear view of a one-piece half-brace, dual-arm bracket type of embodiment of the present invention.
Figure 22B:
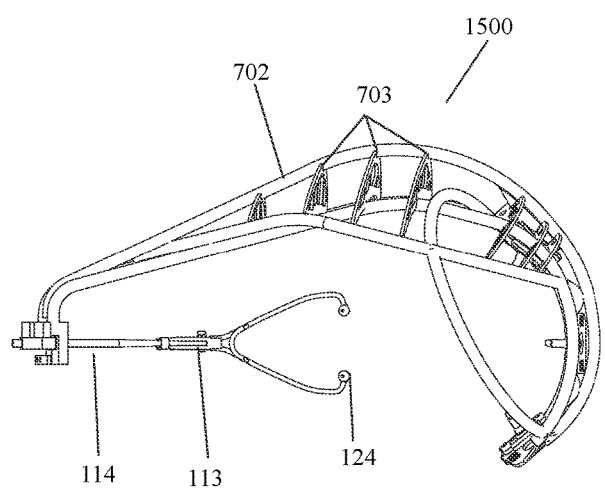
Figure 22C:
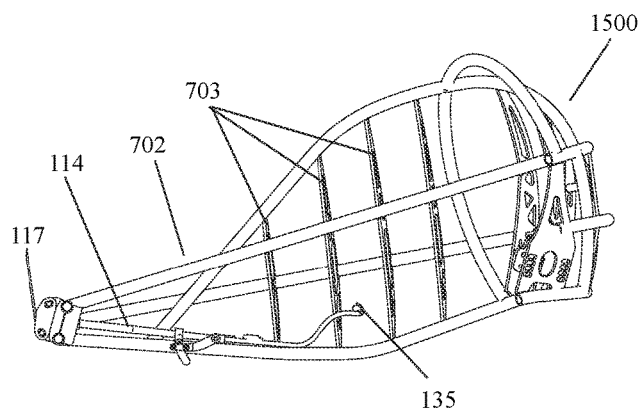
Figure 23A:
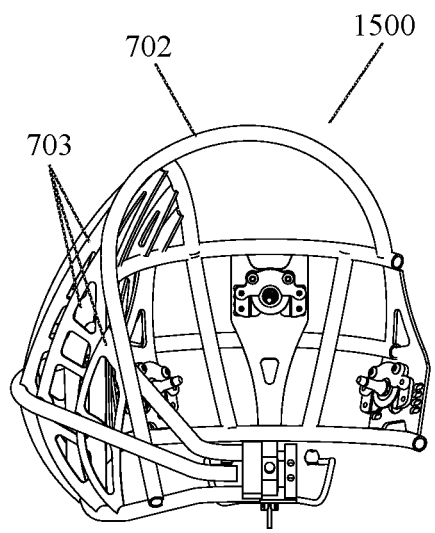
Figure 23B:
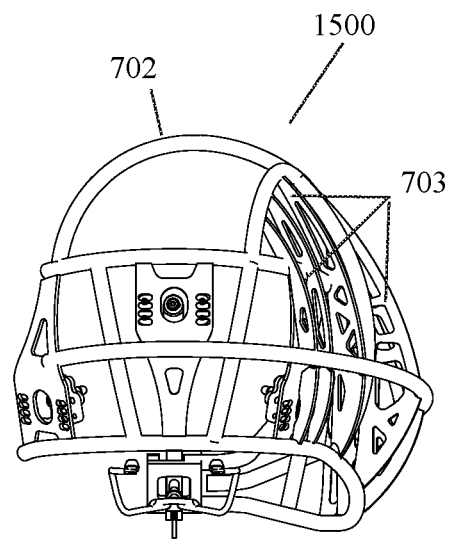

The dentofacial orthopedic device (100) of the present invention comprises a brace (102) and a bracket (114). In different embodiments, the brace (102) and the bracket (114) may be of various dimensions or forms. For example, the brace (102) may be a full-brace type (as in FIGS. 1A and 11A-11E) which encompasses the entire skull periphery or it can be a half-brace type (as in FIGS. 13D-13E and in FIGS. 28A-28F) which extends over only a part of the skull. The full-brace or half brace types of brace (102) can again be a single-piece type (includes rigid segmented type as in FIGS. 1A and 1n FIGS. 20A-20E) or a multi-segment type (as in FIG. 11A-11E and in FIGS. 13D-13E). The bracket (114) can also be made in different shapes and dimensions to suit different purposes. For example, the bracket (114) can be a single-arm type or a dual-arm type, both configured to be anchored to an anterior portion of the skull intra-orally i.e. through the mouth or extra-orally i.e. anchored to an anterior portion of the skull taken through outside of the mouth of user. FIGS. 1B, 11A, 20A, 31B, 32A and 32C illustrate a dual-arm intra-oral bracket (114) whereas FIGS. 12C, 25A, 26A, 27A and 29A show a dual-arm extra-oral bracket (114). Again, FIGS. 11D, 20D and 31D illustrate a single-arm intra-oral type of bracket (114) whereas FIGS. 12D, 25C, 26D, 27B and 29C illustrate single-arm extra-oral type of the bracket (114). In all of the above-mentioned embodiments, irrespective of the type, the brace (102) is always configured to be anchored to the skull to provide support to or hold one or more brackets at a desired place. Similarly, the bracket (114) is configured to be held at one end by the brace (102) and to be anchored to an anterior portion of the skull at its inner end (135). FIG. 1A illustrates a first embodiment of a bone anchored orthopedic device (100). The device (100) mainly includes a single-piece full brace (102) anchored to the skull (107) of a user through at least one cranial anchorage assembly (200). The brace (102) is a structure that adjustably holds other components of the device (100), described in subsequent description, at the desired place. A rear brace segment (105) of the brace (102) is contoured to the shape of the skull (107) and a front brace segment (104) wraps around the anterior region i.e. front of the skull (107). The brace (102) is a loop formed by a rigid or semi-rigid material subject to various physical and anatomical factors. The brace (102) can be designed by an artificially intelligent system and 3D printed, or designed and forged by hand.

According to one embodiment, the at least one cranial anchorage assembly (200), with at least one subcutaneous plate (202), is screwed to the back of the skull to anchor the brace (102) to the skull. In another embodiment, the at least one cranial anchorage assembly (200) is screwed to the skull without a subcutaneous plate (202). The at least one cranial anchorage assembly (200) is screwed at a location that has been optimized for bone geometry, skull thickness and force alignment.

Figure 1B:
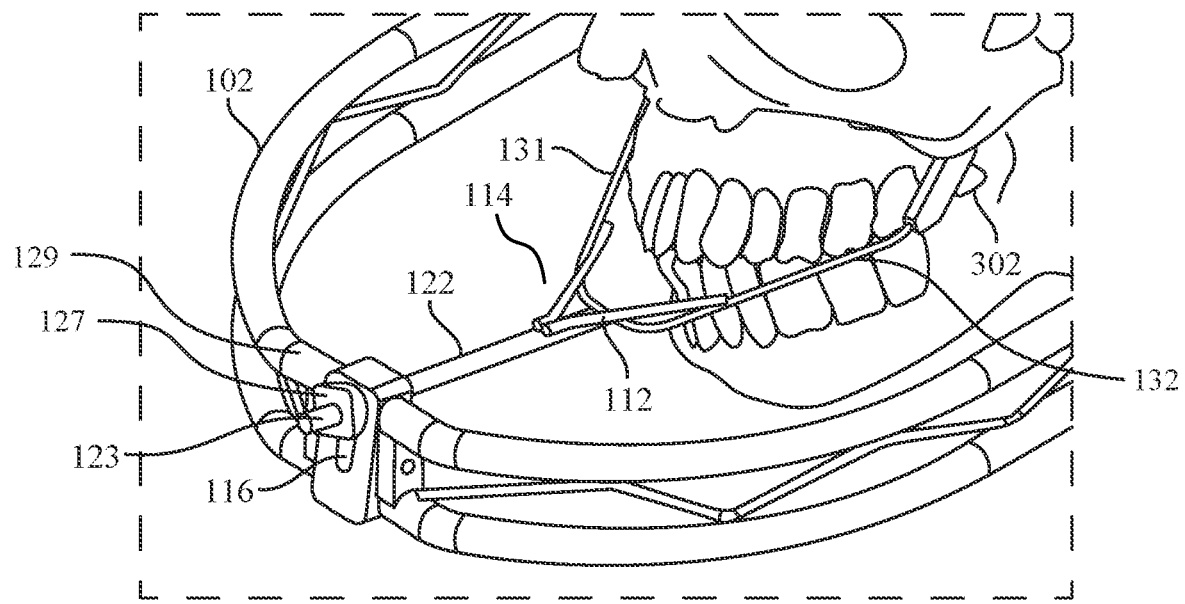
FIG. 1B depicts an enlarged view of the portion of the dentofacial orthopedic device (100) as illustrated in FIG. 1A and identified as detail 1B in FIG. 1A in accordance with the preferred embodiment of the present disclosure.

Reference to FIG. 1B, the dual-arm intra-oral orthodontic bracket (114) comprises a first bracket member (122), a second bracket member (131) and a lockable hinge/bracket joint (112). The first bracket (122) has a proximal end (123) and an opposite distal end (124), and the second bracket member (131) comprises an anterior member (132) and a tail end (133). In accordance with one feature of the preferred embodiment, a proximal end (123) of the first bracket member (122) is rotatably/moveably coupled to the brace (102) at the front-end of the brace (102). The brace (102) is provided with a clamp (116) at the front-end i.e. at the front brace segment (104), and the proximal end (123) is rotatably/moveably fitted into the clamp (116). The clamp (116) can be selectively mounted to any section of a mounting portion (129) of the front brace segment (104). The clamp (116) may be a plurality of configurations (not shown in the figure). In one configuration, the clamp (116) can be a strip with multiplicity of holes. The holes can be grooved at particular distance from each other. The proximal end (123) can be adjustably fitted at a location through one of the multiplicity of holes, where the location can be determined based on required angulation of the orthodontic bracket. In another configuration, the clamp can be just one vertically elongated groove. The proximal end (123) can be fitted at any given point along the vertically elongated groove with at least one nut.

The proximal end (123) can be retracted or advanced to make angular and linear displacement of an orthodontic bracket (114) by turning an adjuster (a nut, for example) (127) in clockwise or anti-clockwise direction at specific angle. The specific angular position at which the proximal end (123) has to be set is determined by a desired angular and linear position of the orthodontic bracket (114).

According to another feature of the preferred embodiment, the orthodontic bracket (114) is a rigid mouth piece placed inside the user's mouth. In one example, the orthodontic bracket (114) can be mounted on an anterior portion of the skull e.g. on a bony structure inside the user's mouth such as on the alveolar process of maxilla. In another example, the orthodontic bracket (114) can be anchored intra-orally into the maxilla, another bony structure connected to it, or another bony structure that needs to be moved. According to the preferred embodiment, the orthodontic bracket (114) is coupled to the brace (102) through the proximal end (123).

Figure 4A:
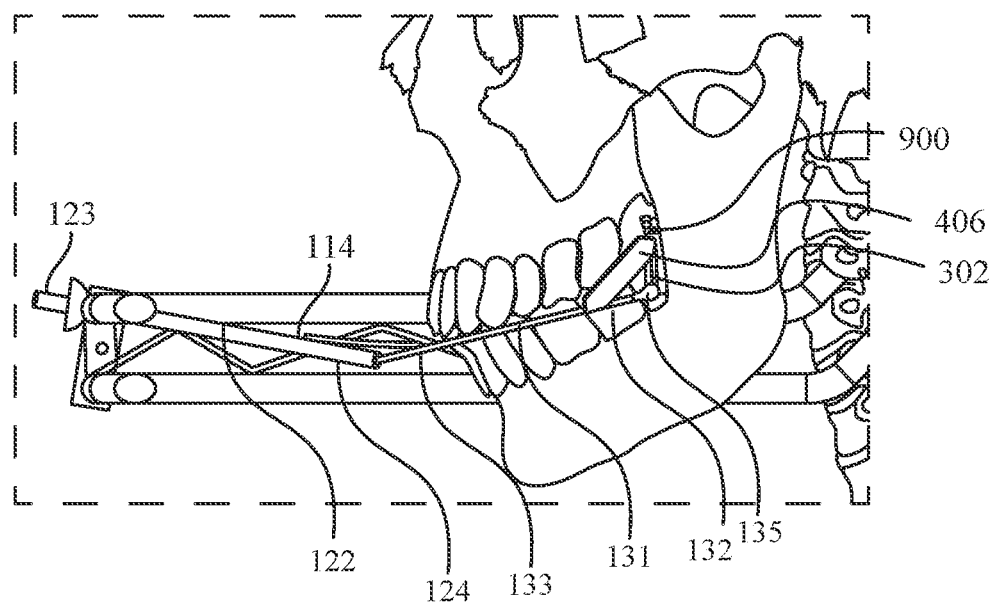
FIG. 4A illustrates a locked position of the orthodontic bracket (114) at zero degree or neutral angle, in accordance with the preferred embodiment of the present disclosure.
Figure 4B:
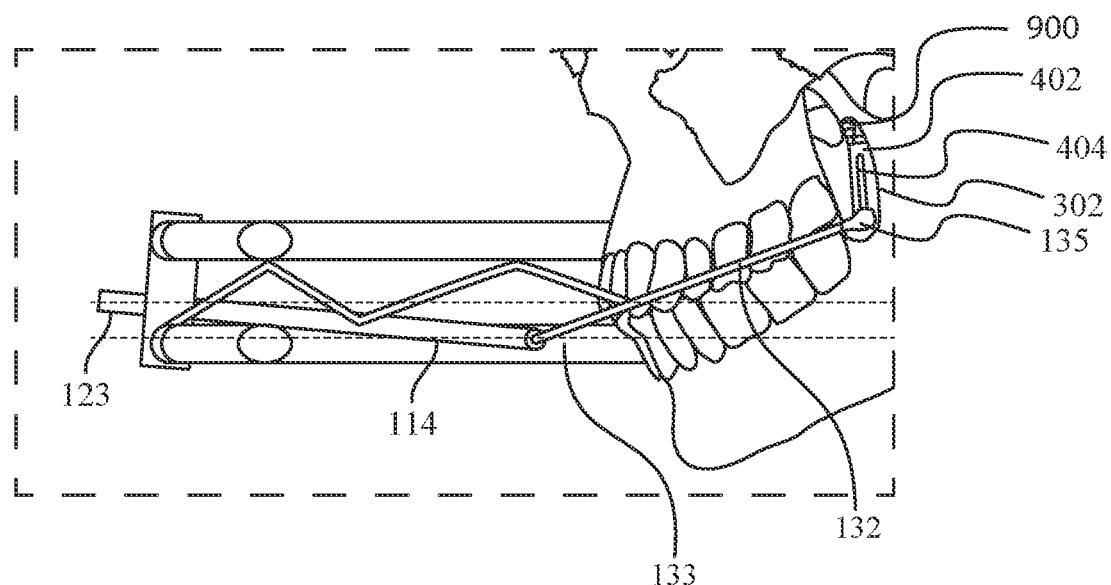
FIG. 4B illustrates an angularly displaced position of the orthodontic bracket (114) at 10-degree angle, in accordance with the preferred embodiment of the present disclosure.
Figure 5A:
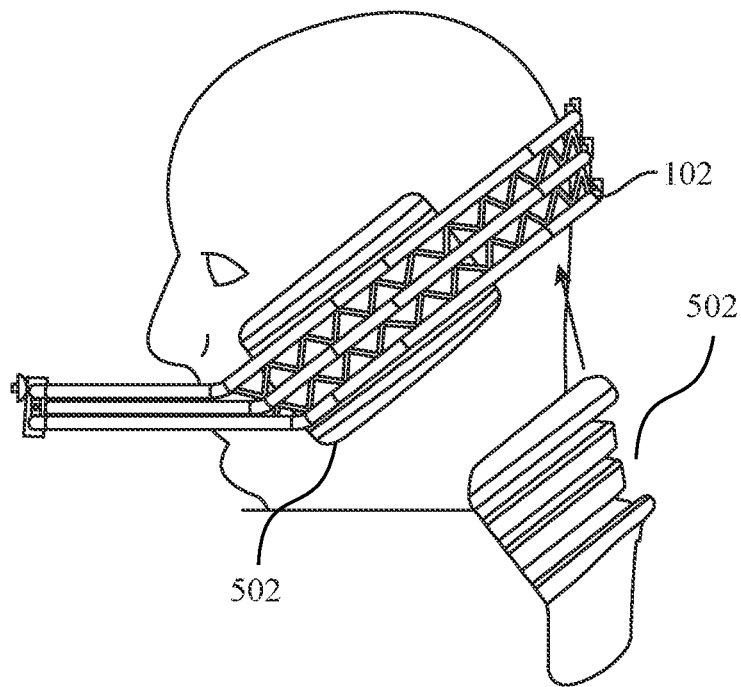
FIG. 5A illustrates a side view of a cushion partially before being inserted beneath the brace and FIG. 5B illustrates side view of the cushion after being inserted beneath the brace, in accordance with the preferred embodiment of the present disclosure.
Figure 5B:
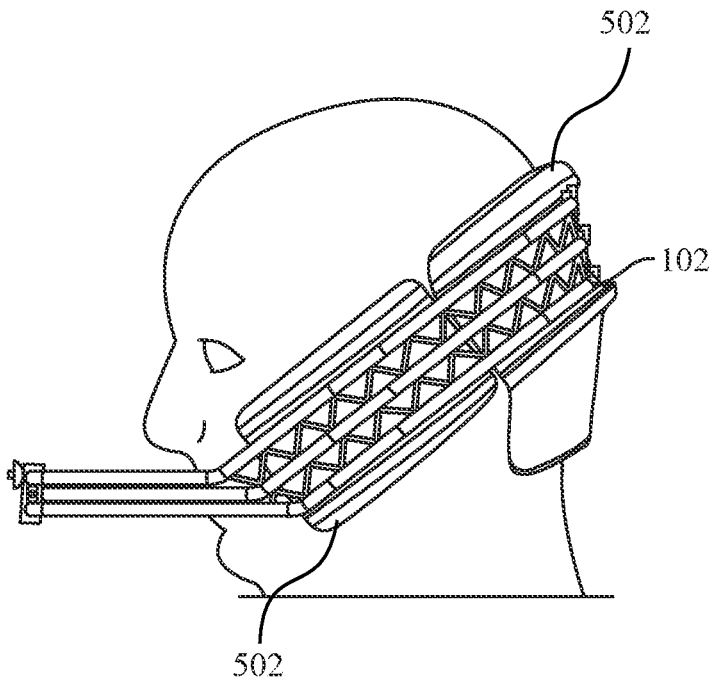

FIG. 1B depicts the bracket (114) of the orthodontic device (100) coupled to the brace (102) through the proximal end (123) in closer view. Although, the figure specifically shows the orthodontic bracket (114) configuration in 'Y' formation having a pair of arms i.e. dual arms extending from said tail end (133), other suitable configurations having one or more arms such as a single arm configuration dimensioned to fit at least partially inside or outside the mouth of a user can also be used. The anterior member (132), through its inner end (135), of the second bracket member (131) of the bracket (114) is configured to be rotatably affixed to a bony structure/anterior portion of the skull inside or outside a mouth of a user by at least one fastener. The fastener can be a ball and socket joint type of fastener (900) or a tooth-borne orthodontic appliance (1000). FIGS. 1B, 4A and 4B show use of at least one first anchorage screw (302) which flexibly connects the inner end (135) of the anterior member (132) to a ball and socket type of fastener (900) screwed on left and right side of the anterior portion bony structure (306) inside the mouth. The first anchorage screw (302), as shown in FIGS. 4A and 4B, comprises a screw body (402) having a groove (404) and a sliding locking bracket (406). The groove (404) is configured to let the inner end (135) of the anterior member (132) slide up and down and the sliding locking bracket (406) facilitates the inner end (135) to remain at a desired position. The ball and socket system (900), as illustrated in FIGS. 10A-10D, comprises a fastener end (300) configured to be implantable in the bony structure and, a socket (301) configured to rotatably receive a ball end (135). The ball end (135) can be a part of the screw body (402) of the first anchorage screw (302).

A bracket joint (112) securely attaches the second bracket member (131) with the first bracket member (122). The bracket (114) is so configured that the bracket joint (112) remains outside the mouth of the patient as shown in FIG. 1B. The bracket joint (112) can be a rotational joint allowing easy jaw movements by way of its coupling between the first bracket member (122) and second bracket member (131). The proximal end (123) is adjustably coupled to the brace (102) through the clamp (116) and secured by the nut (127).

Patient's airway patency, posture, bone structure, degree of midfacial deformity, bone thickness, bone geometry are the factors to be considered while predetermining the angular or linear displacement force to be applied. The predetermined first displacement force is applied on the orthodontic bracket (114), in turn, the orthodontic bracket (114) retracts or advances the maxilla or similar anterior portion of the skull as a result of linear and/or angular displacement. As one end of the brace (102) is anchored to the skull, a second displacement force is transmitted to the skull as well in a direction opposite to the direction of the first force. The displacement forces cause expansion of cranial sutures. Gradual application of displacement force and expansion of cranial sutures results in separation of cranial sutures and new bone formation through osteogenesis.

Figure 2A:
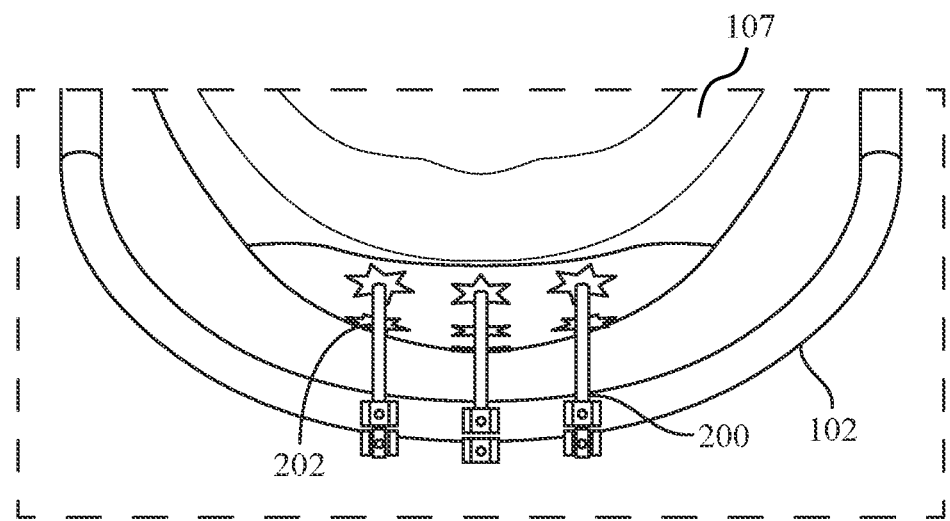
FIG. 2A illustrates a set of cranial anchorage assemblies anchored into the skull, in accordance with the preferred embodiment of the present disclosure.
Figure 2B:
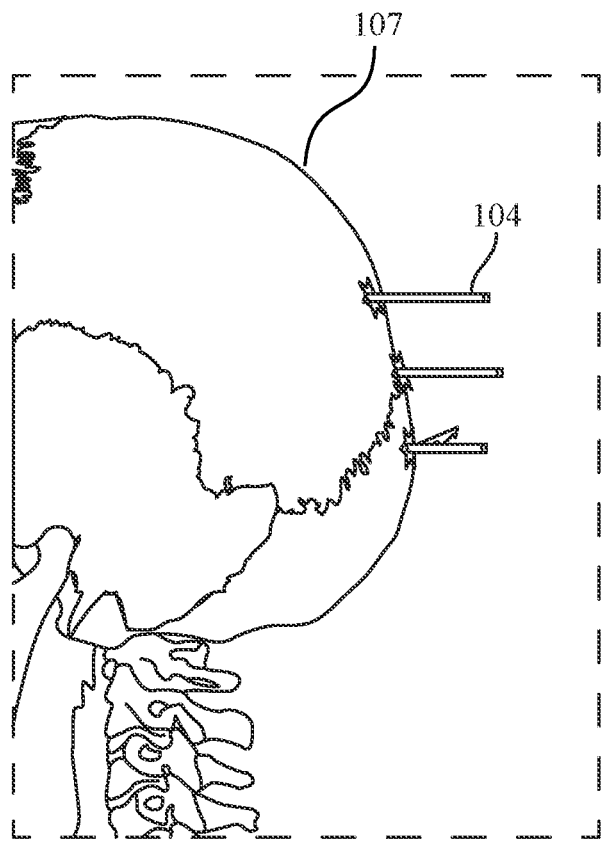
FIG. 2B shows a side view of the cranial anchorage assemblies anchored into the skull without being attached to the brace (102), in accordance with the preferred embodiment of the present disclosure.

FIG. 2A specifically illustrates a set of cranial anchorage assemblies (200) anchored into the skull (107). The screws (200) are preferably of longitudinal bar shape and screwed into the skull (into the rear section 204 or the occipital bone region, for example) through a set of subcutaneous plates (202). As shown in the Figure, one end of the cranial anchorage assembly is anchored into the skull and other end is fixed to the brace (102). FIG. 2B shows a side view of the cranial anchorage assemblies (200) anchored into the skull without being attached to the brace (102). FIGS. 15A-15E and 16A-16F illustrate further details of cranial anchorage assembly (200).

Figure 3:
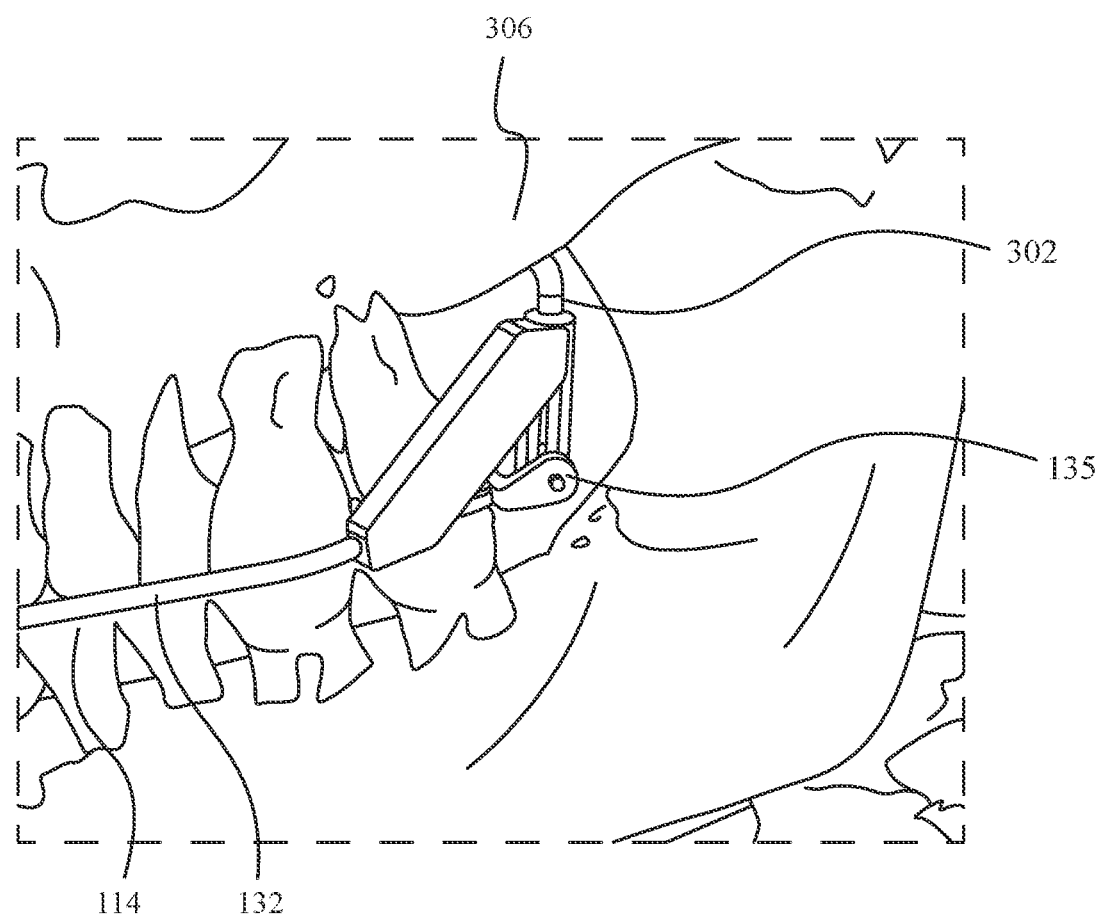
FIG. 3 illustrates anchoring of the orthodontic bracket (114) to the maxilla bone structure with a first anchorage screw type of fastener, in accordance with the preferred embodiment of the present disclosure.

As illustrated in FIG. 3, according to the preferred embodiment, the orthodontic bracket (114) is anchored to an anterior portion of the skull e.g. to a bony structure inside the mouth of a user such as the maxilla bone structure (306). A maxilla screw or first anchorage screw (302) is anchored to left side of maxilla bone structure (306) with the help of a fastener as shown in the figure. Another first anchorage screw (302) may also be anchored to right side of maxilla bone structure (306), not shown in the figure. An anterior member (132), which is a part of the bracket (114), is a shaft interconnecting the first anchorage screws (302) forming a C shape loop. The anterior member (132) is connected to the first anchorage screws (302) in such a way that 123 the connection allows angular and linear displacement of the orthodontic bracket (114) consequent to forces transmitted though the proximal end (123) due to actuation of the adjuster i.e. rotation of the nut (127).

It is to be noted that the rotation/adjustment of the proximal end (123) is highly subjective to degree of deformity of an individual. According to one aspect of the embodiment, a surgeon may keep the patient under regular observation to track the maxillary advancement. Close medical examination, for example Computed Tomography (CT) Scanning, can give clear insight of the current progress. Based on the scanning results, the surgeon can determine the required course of action. The surgeon may use computer assisted pre-operative planning tools to construe a required operative action plan. Calculated forces are applied on the set of cranial anchorage assemblies. The forces to be applied are calculated to be greater than internal retentive forces within the cranial sutures to be separated. For the calculations of determining the required forces, the computer operated pre-operative planning tool may consider the amount of mid-facial advancement to be achieved, internal retentive forces within the cranial sutures and maximum shear forces that the anchorage screws can withstand. The action plan is construed for gradual separation of the cranial sutures and advancement of the maxillary structure, and other structures.

FIG. 4A and FIG. 4B illustrates angular displacement of the orthodontic bracket (114) due to tension applied through the proximal end (123). Specifically, FIG. 4A illustrates locked position of the orthodontic bracket (114) where the proximal end (123) of the bracket (114) is rested at upward angle (123) relative to the brace (102). As shown in FIG. 4B, the proximal end (123) is tilted by certain degree such that the tail end (133) of the bracket is rested at an angle below the previous locked position. Such angular displacement is caused to the rotational coupling between the tail end (133) or the bracket (114) and the brace (102) through the proximal end (123). With the angular position of the proximal end (123), the position of the anterior member (132) is controlled.

Figure 6A:
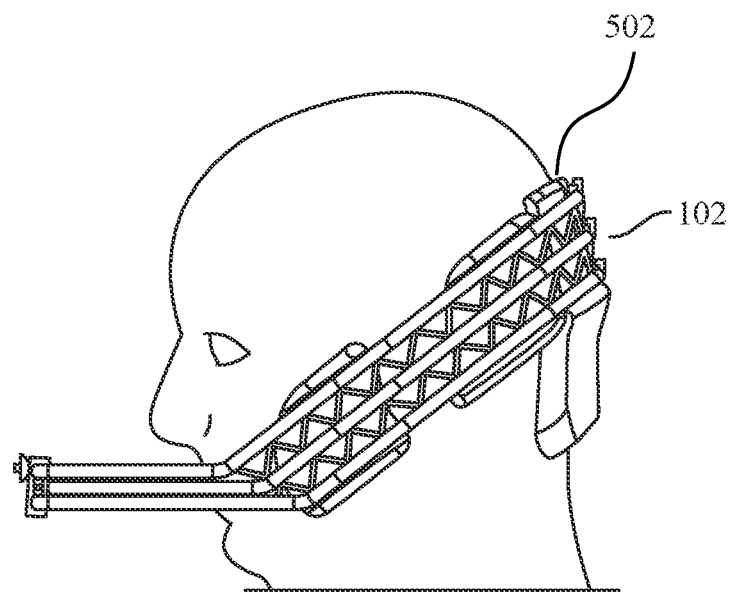
FIG. 6A illustrates a closer side view of the cushion with the brace, in accordance with the preferred embodiment of the present disclosure.
Figure 6B:
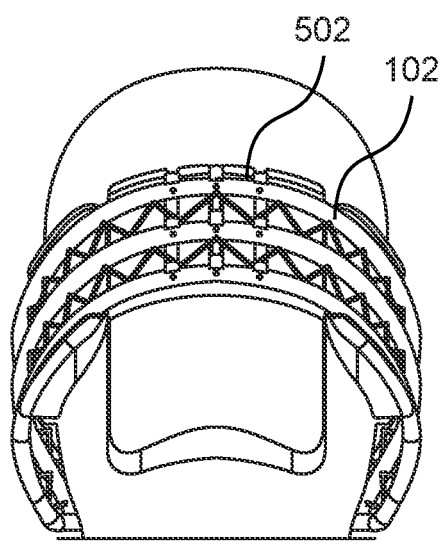
FIG. 6B illustrates a rear view of the cushion with the brace, in accordance with the preferred embodiment of the present disclosure.

FIGS. 5A, 5B, 6A and 6B illustrate another feature of the preferred embodiment, a cushion for user comfort. Sporting a brace (102) anchored into the skull may be a discomforting experience for a user. As a solution, a cushion (502) can be placed beneath the brace (102) that adds extra comfort and safety to the user. The brace (102) is adapted to provide a space between the skull (107) and the brace (102) to removably accommodate the one or more cushioning pads. The cushioning pads (502) can sustain an accidental force application, protecting the user from the force impact and its resulting consequences. FIG. 6A and FIG. 6B illustrate the cushion (502) inserted beneath the brace (102) from side view and rear view respectively. The cushion (502) can be made up of flexible and shock absorbing material.

Figure 7A:
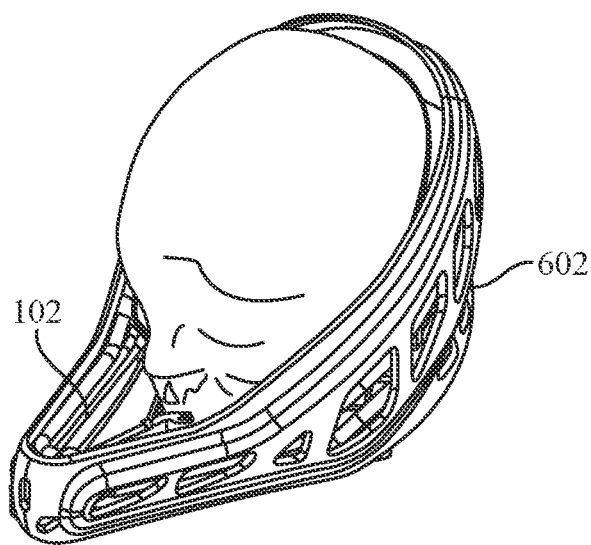
FIG. 7A illustrates a helmet (602) fitted on the device (100) when the user is wearing it.
Figure 7B:
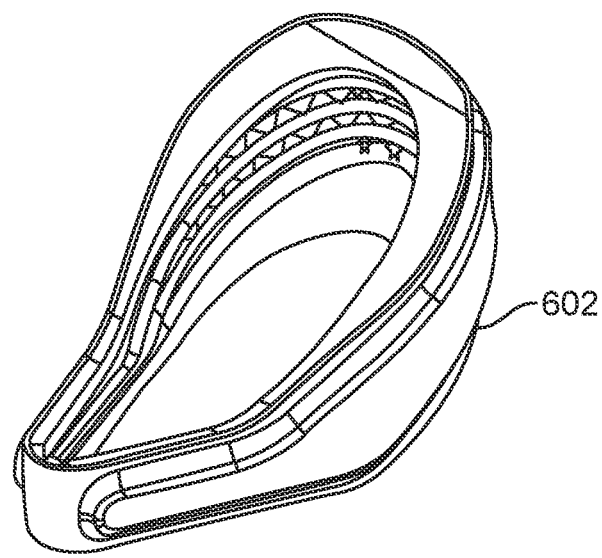
FIG. 7B illustrates the device (100), when not worn by the user, with the helmet (602)
Figure 7C:
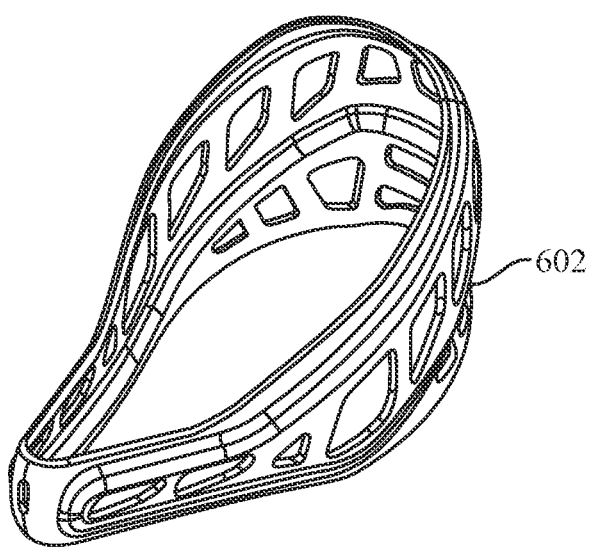
FIG. 7C illustrates a helmet frame.

FIGS. 7A, 7B and 7C illustrate yet another safety feature of the preferred embodiment, a removably wearable helmet (602) for the device (100). The helmet (602) is constructed to comfortably cover the device (100) and endure the adequate strength to prevent any accidental damages. The brace (102) is configured to accommodate the helmet (602). The feature protects the user from suffering any damage that may be the result of force impact on the device (100), Additionally, the helmet adds aesthetic value to the device (100) that may boost user's confidence. FIG. 7A shows the helmet (602) fitted on the device (100) when the user is wearing it. FIG. 7B illustrates the device (100), when not worn by the user, with the helmet (602). FIG. 7C shows a helmet frame.

Figure 8A:
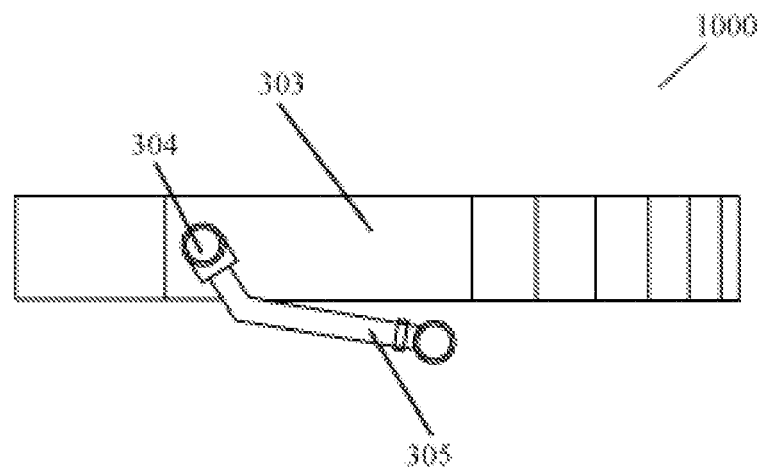
FIGS. 8A and 8B show a side and a top view respectively of a tooth-borne type of orthodontic appliance fastener.
Figure 8B:
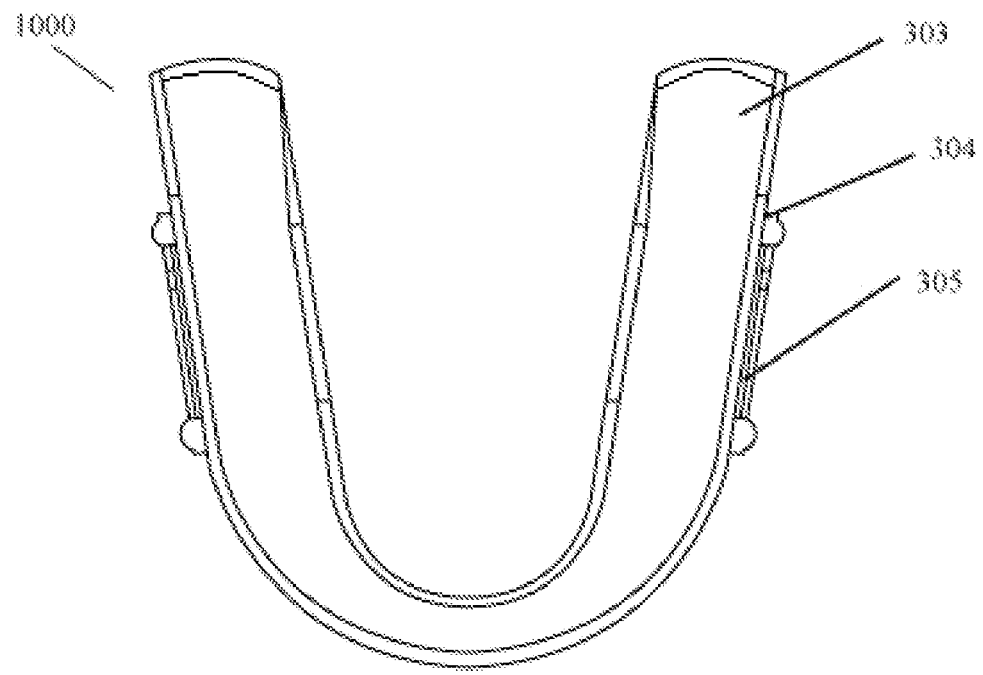
Figure 9A:
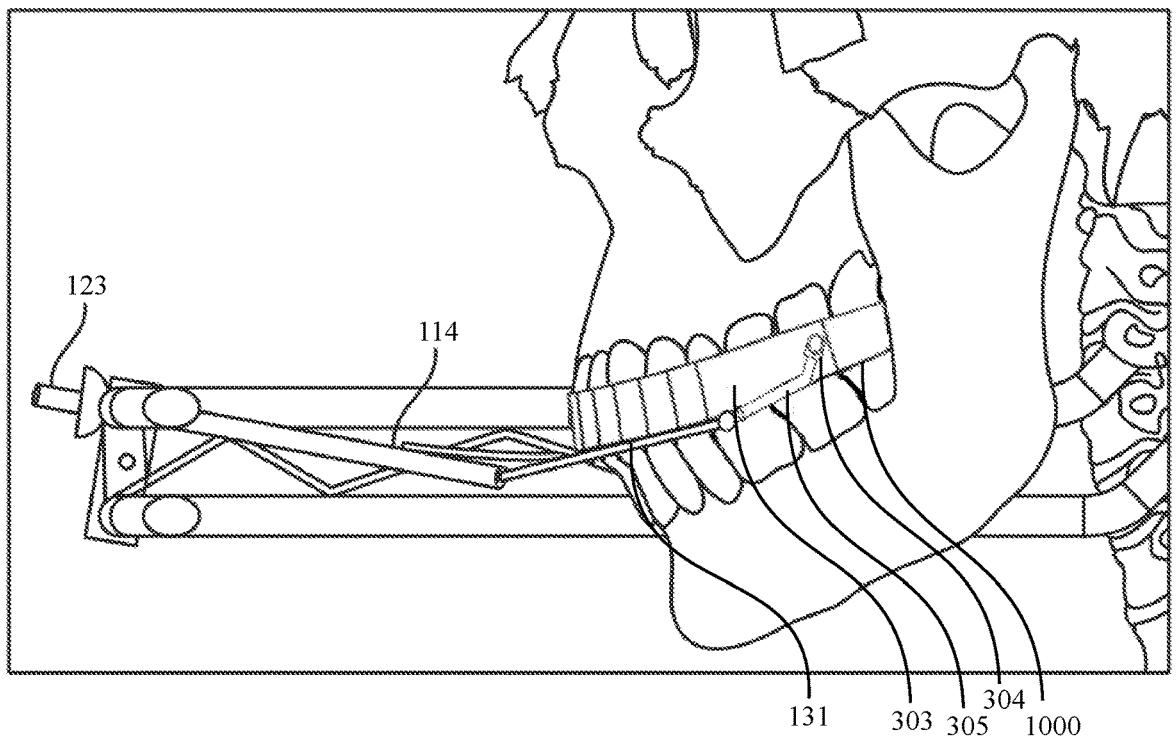
FIG. 9A illustrates an anterior member of the bracket affixed to the upper teeth of a patient by the orthodontic appliance fastener to anchor the bracket.
Figure 9B:
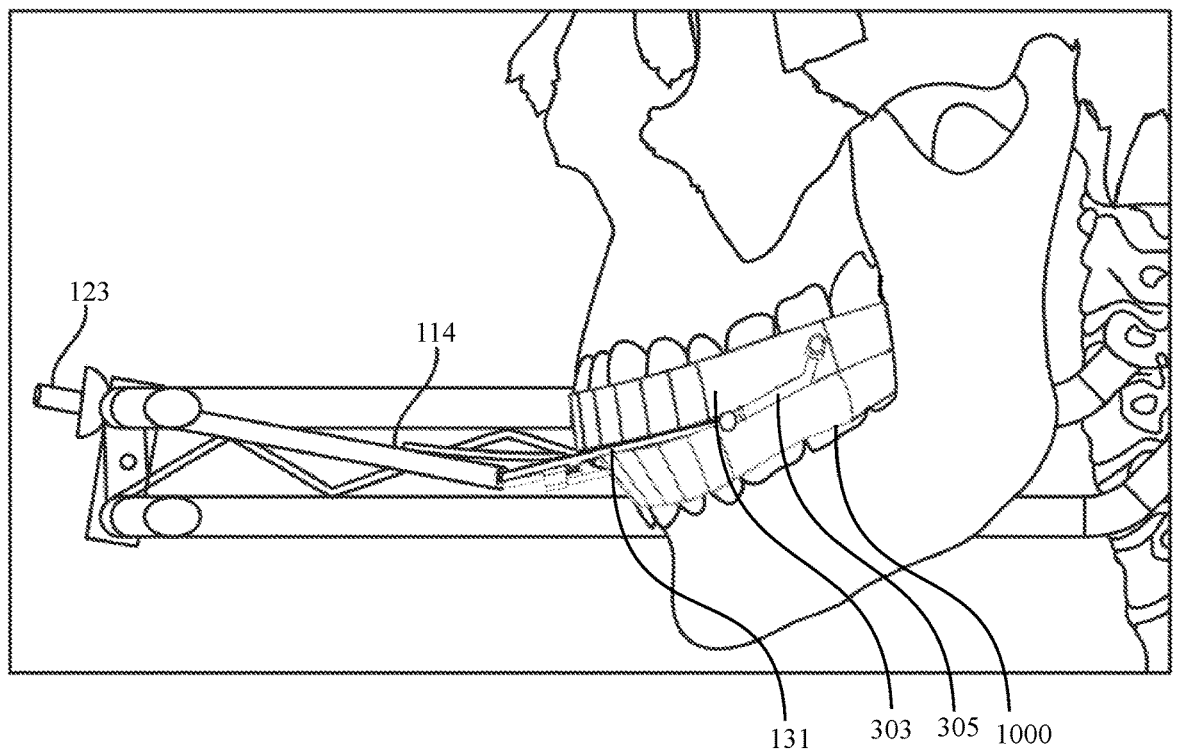
FIG. 9B illustrates the anterior member of the bracket affixed to the upper and lower teeth of a patient by the orthodontic appliance fastener to anchor the bracket.
Figure 10A:
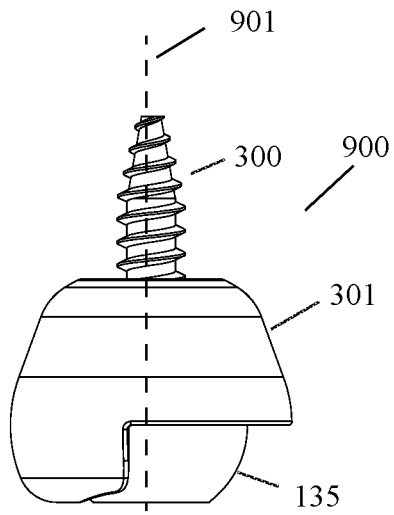
FIGS. 10A-10D show two side views, a cross section and a perspective view, respectively, of a ball and socket joint system type of fastener.
Figure 10B:
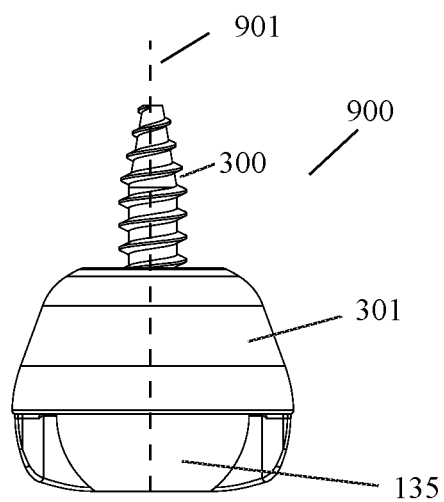
Figure 10C:
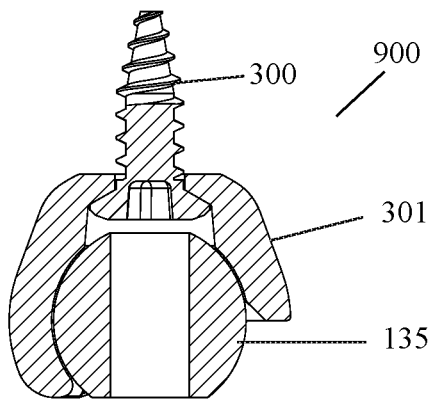
Figure 10D:
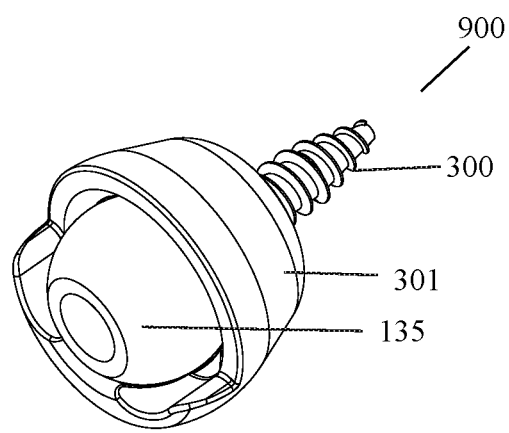
Figure 30A:
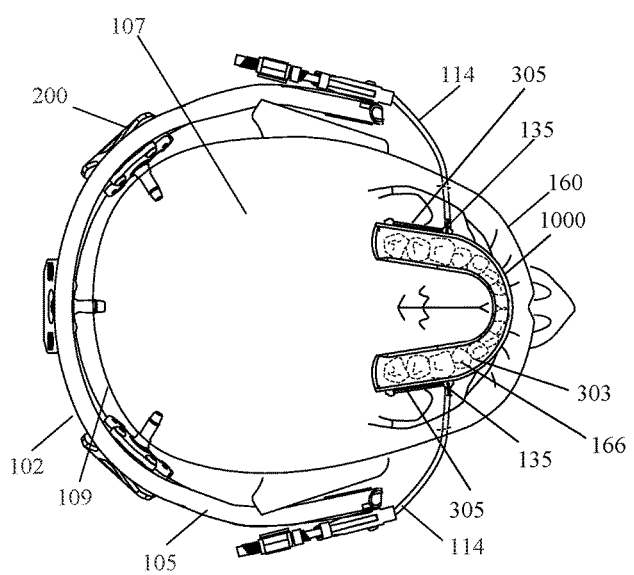
FIGS. 30A and 30B illustrate a bottom view of a full-rear brace segment with two extra oral brackets being anchored through a brace segment.
Figure 30B:
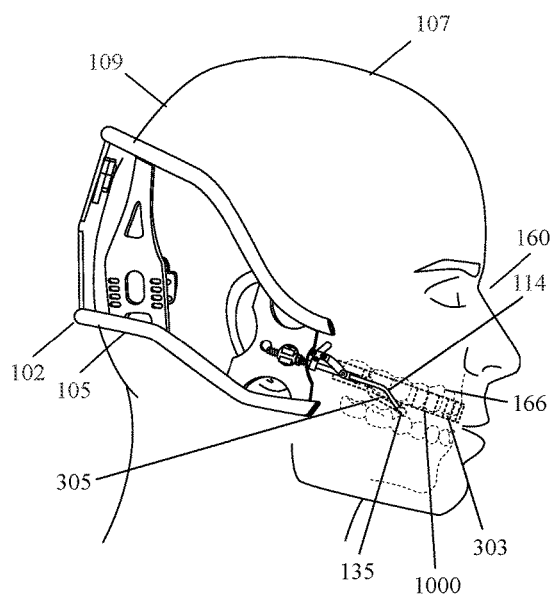
Figures 32A, 32B:
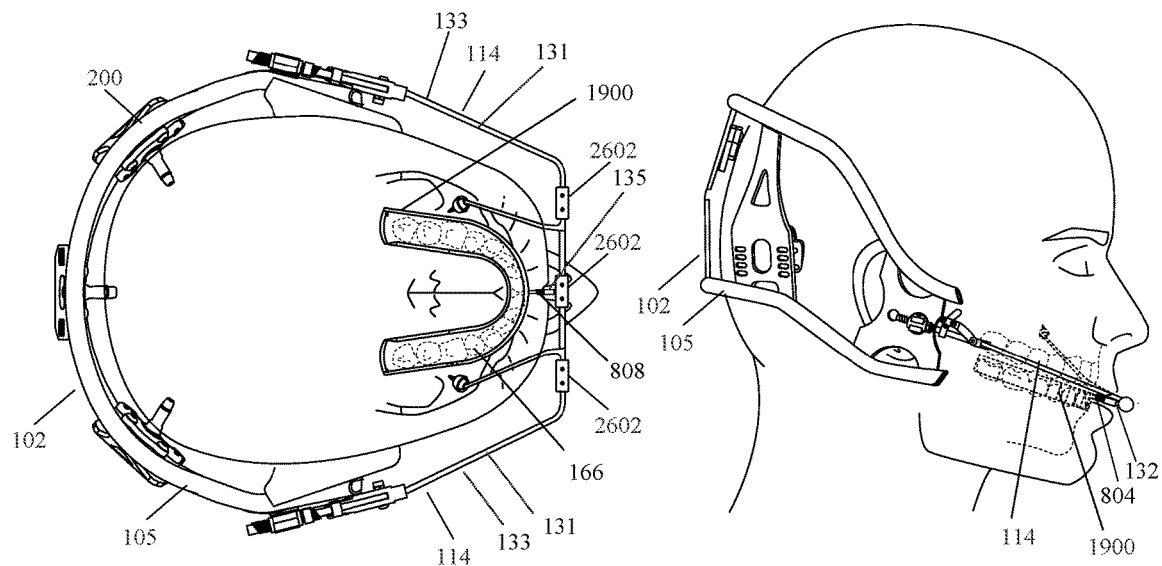
FIGS. 32A and 32B illustrate a bottom view and a side view respectively of the device having a full-rear brace segment with intra-oral brackets anchored to the lower teeth through an orthodontic appliance.
Figures 32C, 32D:
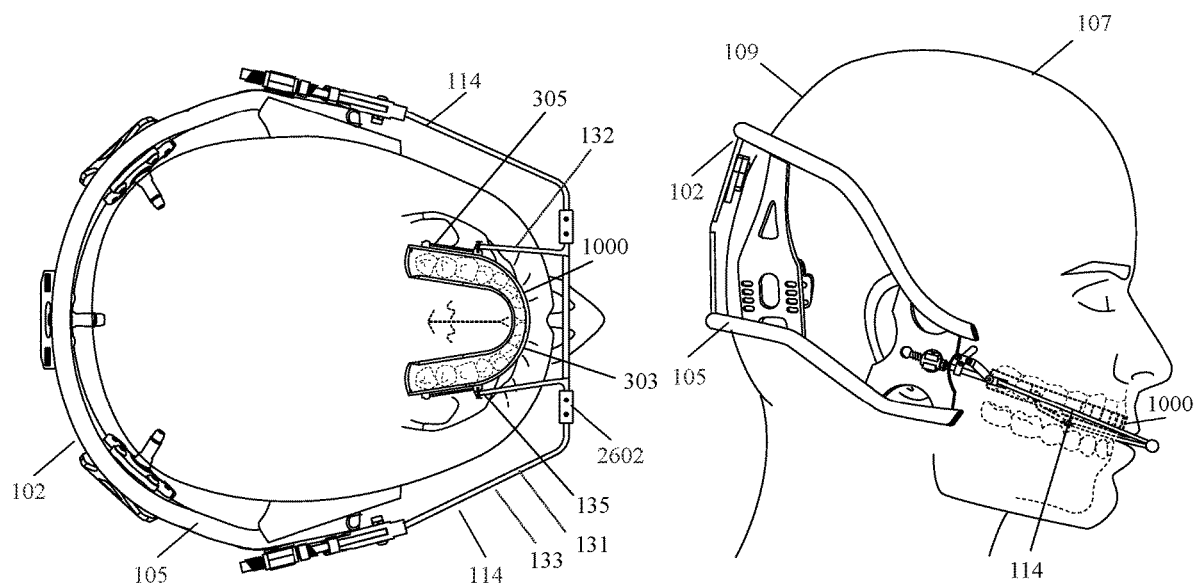
FIGS. 32C and 32D illustrate a bottom view and a side view respectively of the device having a full-rear brace segment with two one-arm intra-oral brackets anchored to the upper teeth through another orthodontic appliance.

The orthodontic appliance (1000) type of fastener, as shown in FIGS. 8A and 8B, comprises a removable rigid or flexible orthodontic mouthpiece (303) that is designed to fit on an anterior portion of the skull, the teeth of the upper jaw and/or the lower jaw in the present example, and one or more linkages (305) configured to pivotally and/or adjustably connect the orthodontic mouthpiece (303) to the inner end (135) of the anterior member (132). The dimensions and shapes of the orthodontic mouthpiece (303) and the linkage (305) are optimized in relation to the mouth of the user such that the user may maintain a closed mouth while wearing the appliance. Rotational joints (304) connect linkage (305) to the orthodontic mouthpiece (303) at one end and the other end of the linkage (305) is rotatably connected to the inner end (135) of the anterior member (132) of the bracket (114) as illustrated in FIG. 9A (extra-orally to the mouth with skin penetration as shown in FIGS. 30A-30B or intra-orally through the mouth as shown in FIGS. 32C-32D). The orthodontic appliance (1000), attached to an extra-oral bracket (114), can also be anchored to the lower jaw/teeth line if needed. In some embodiments, as shown in FIG. 9B, the orthodontic appliance (1000) may comprise two pieces of orthodontic mouthpieces (303) adaptable to the teeth or dental arches of the upper and lower jaws. Separate linkage (305) can be provided for each of the mouthpieces (303) or both can be connected through a single linkage (305) as shown in FIG. 9B. A lower mouthpiece (1000) may be used to hold the lower jaw to the bracket (114) while the user sleeps, to prevent collapse of the tongue into the airway.

Figure 12A:
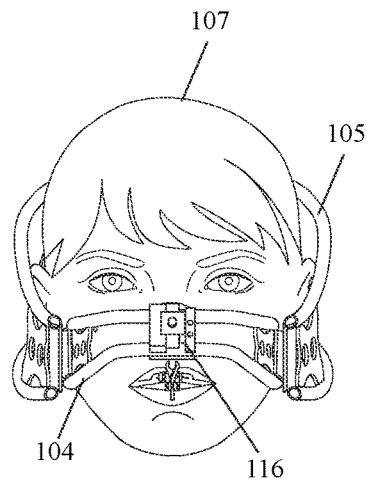
FIGS. 12A and 12B illustrate a front view and a rear view of the two-part full brace in use.
Figure 12B:
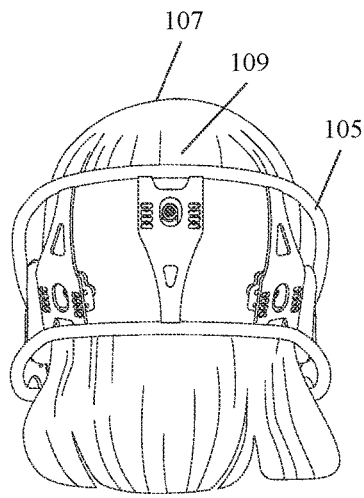
Figure 12C:
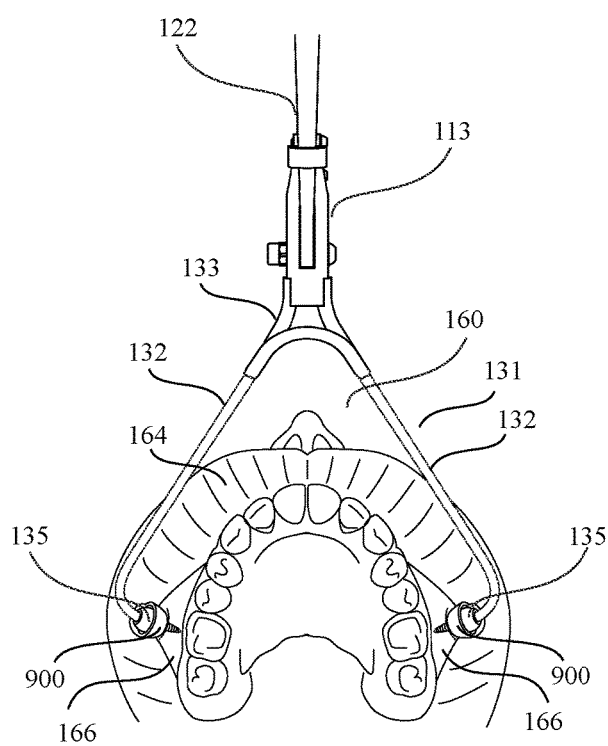
FIGS. 12C and 12D illustrate anchoring of the dual-arm and single-arm second bracket member respectively of the intra-oral version of the bracket.
Figure 12D:
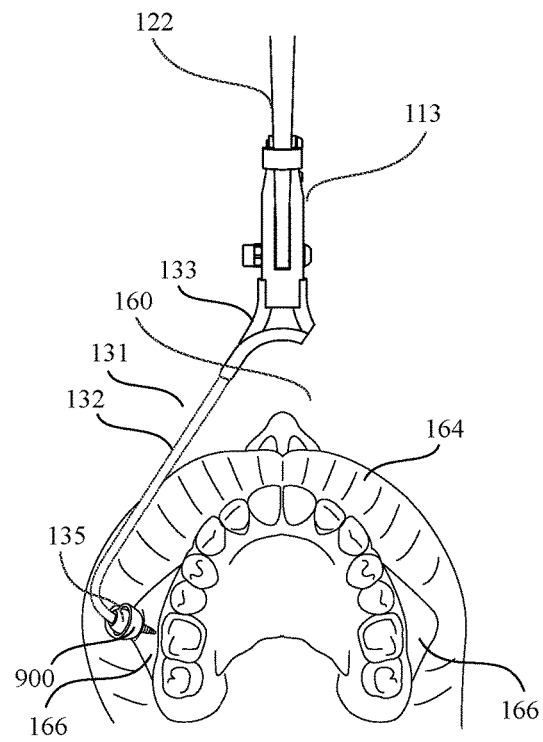
Figure 13A:
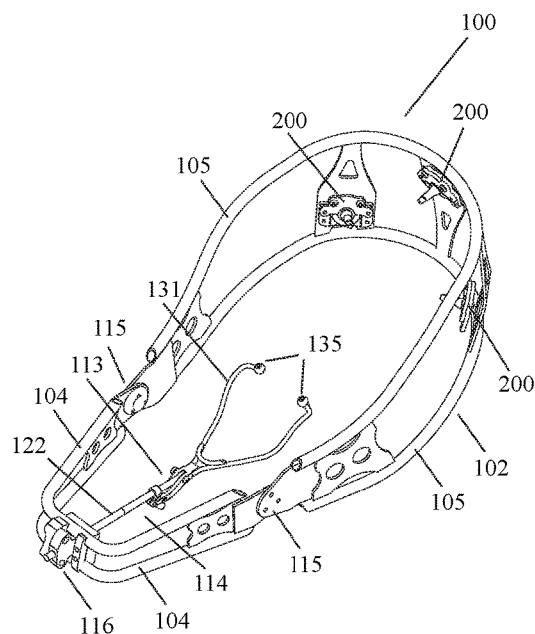
FIGS. 13A-13C illustrate a perspective view, a top view and a side view respectively of a two-part full-brace, intra-oral dual-arm full-bracket type of an embodiment of the dentofacial orthopedic device.
Figure 13B:
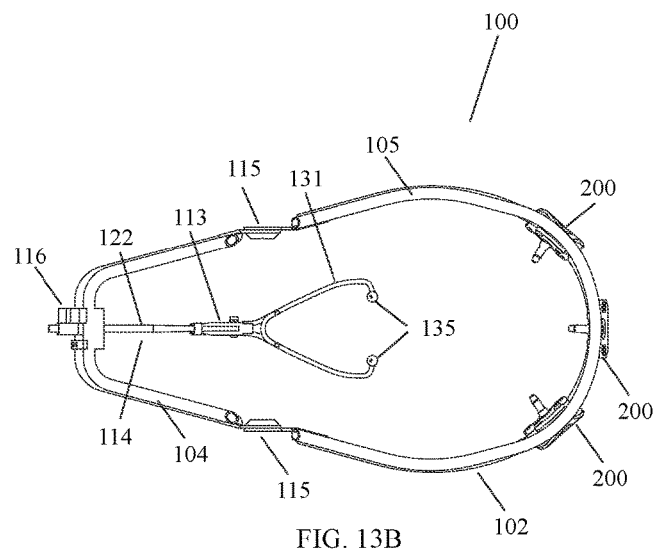
Figure 13C:
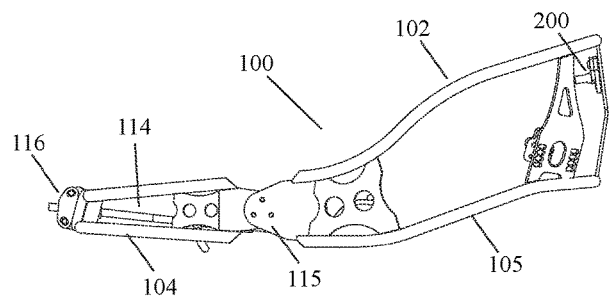
Figure 13D:
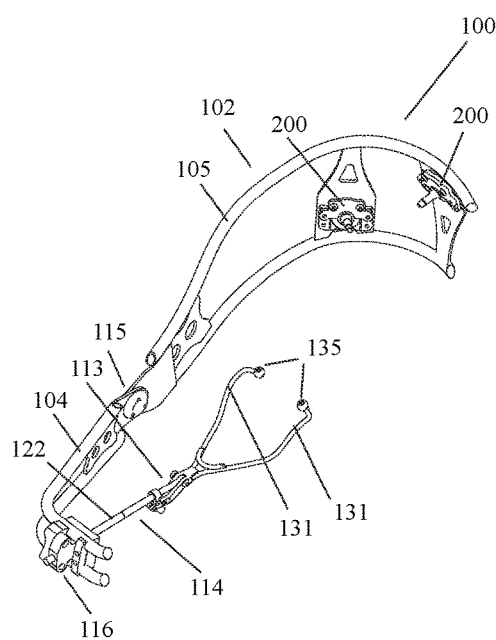
FIGS. 13D-13E illustrate perspective views of a two-part half-brace, dual-arm full-bracket type and a two-part half-brace, single-arm half-bracket type of an embodiment of the dentofacial orthopedic device respectively.
Figure 13E:
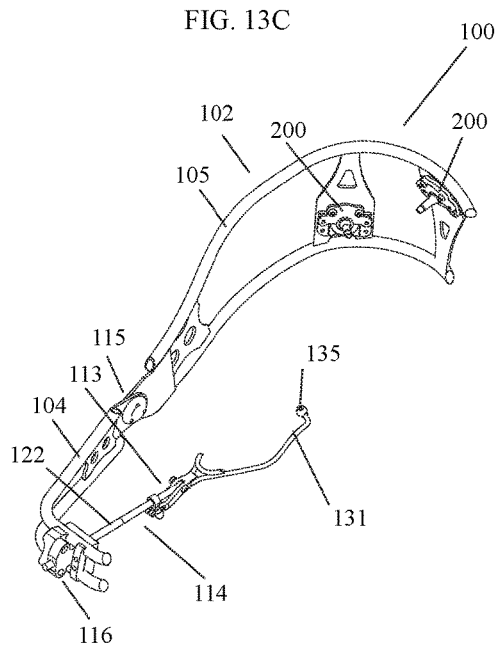
Figure 15A:
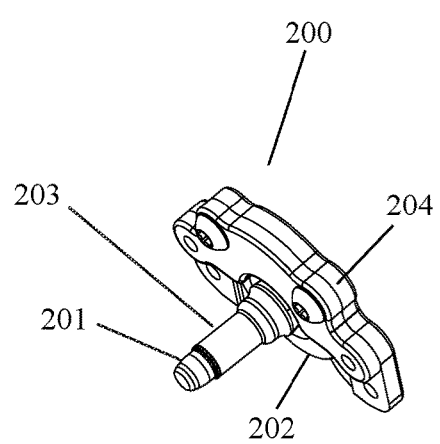
FIGS. 15A-15E show perspective, front, back, side, a first top and second top views, respectively of a cranial anchorage assembly with a plate assembly.
Figure 15B:
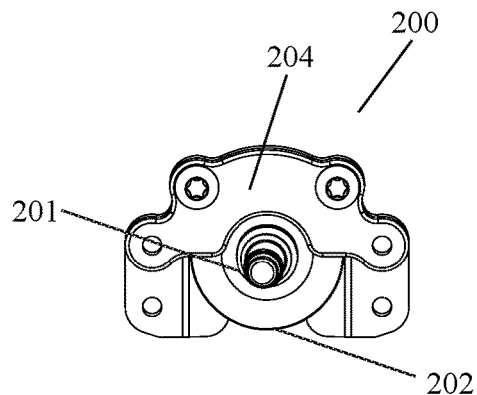
Figure 15C:
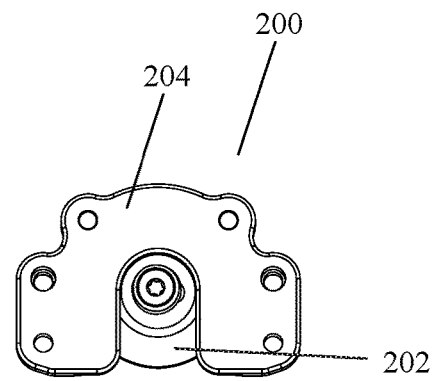
Figure 15D:
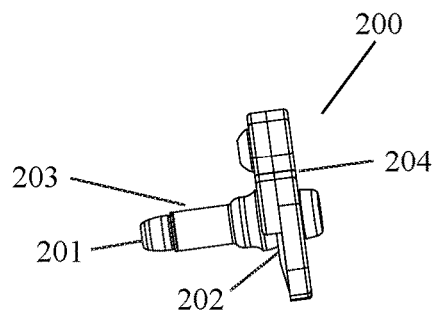
Figure 15E:
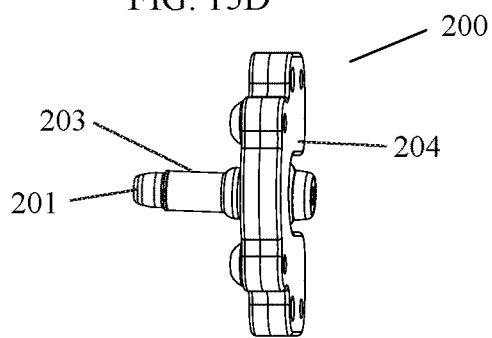

FIGS. 11A-11C, 12A, 12B, 13A-13C, 14A and 14B show the structure of the device (100) which comprises a segmented two-part full-brace (102) and an intra-oral dual-arm full bracket (114). The bracket (114) is coupled to the mounting portions (129) of the brace with the help of one or more clamps (117). The brace (102) comprises at least one front brace segment (104) and at least one rear brace segment (105) connected by hinge to the front brace segment (104) by a rotating joint (115). The front brace segment (104) and the rear brace segment (105), in the present example, extend to both sides of the skull (107) as shown in FIG. 13A or may extend to only one side of the skull (107) as shown in FIGS. 13D and 13E for a two-part half brace version of the brace (102).

Figure 16A:
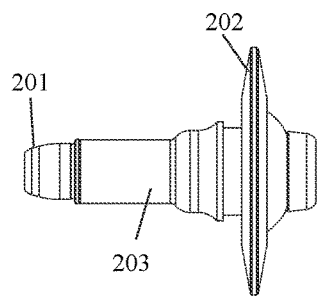
FIGS. 16A, 16B, 16C and 16D show a first side view, a second side view, a top view and a side sectional view respectively of the cranial anchorage assembly.
Figure 16C:
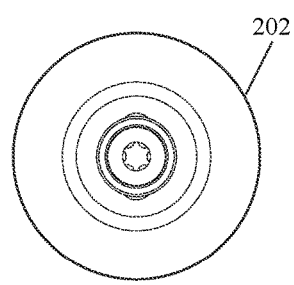
Figure 16E:
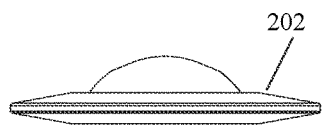
FIGS. 16E and 16F show a side and top views of the plate.
Figure 16B:
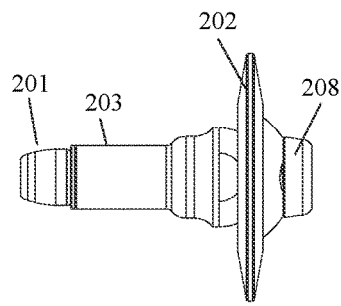
Figure 16D:
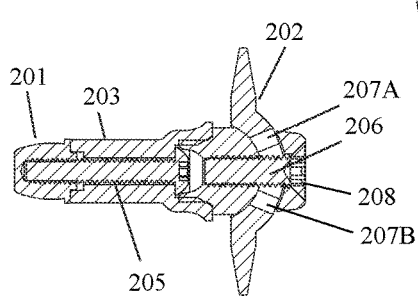
Figure 16F:
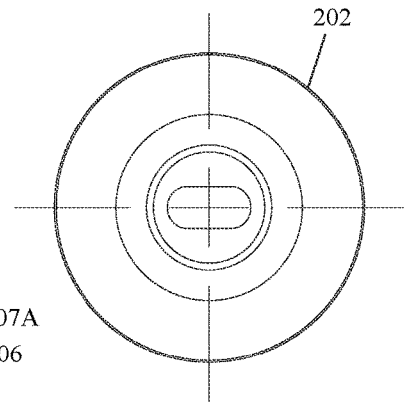
Figure 17A:
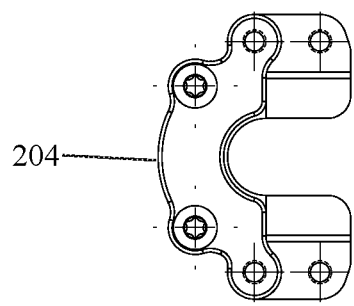
FIGS. 17A-17D show a top view, a side view, a bottom view and a perspective view respectively of the plate assembly.
Figure 17C:
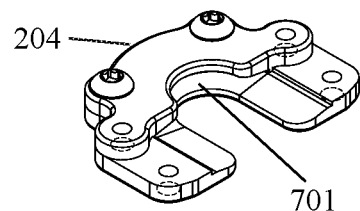
Figure 17B:
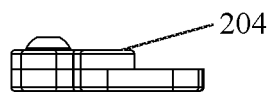
Figure 17D:
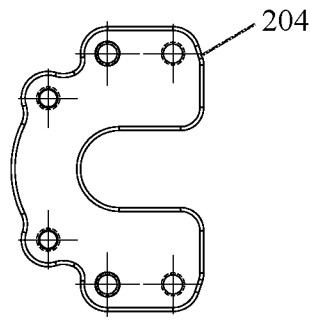
Figure 18A:
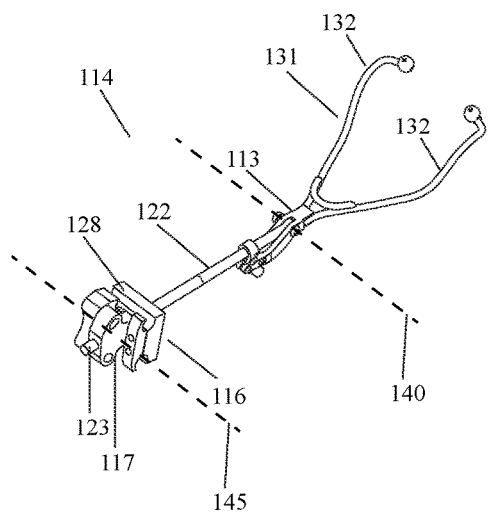
FIG. 18A illustrates a perspective view of a dual-arm bracket with a clamp.
Figure 18B:
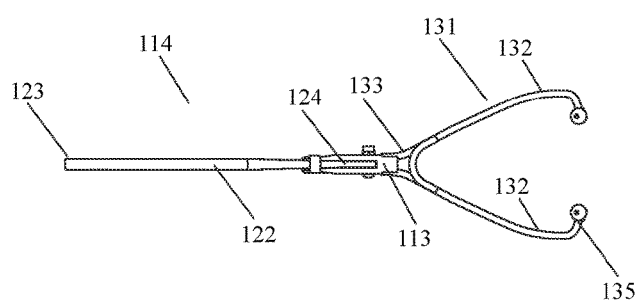
FIGS. 18B and 18C show top and side views, respectively, of a dual-arm bracket without the clamp.
Figure 18C:
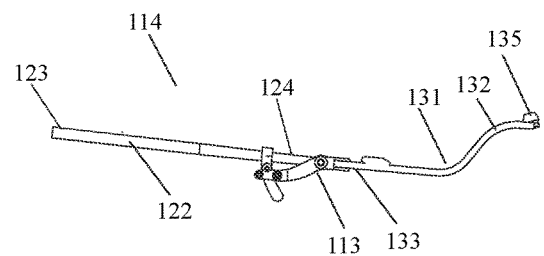
Figure 18D:
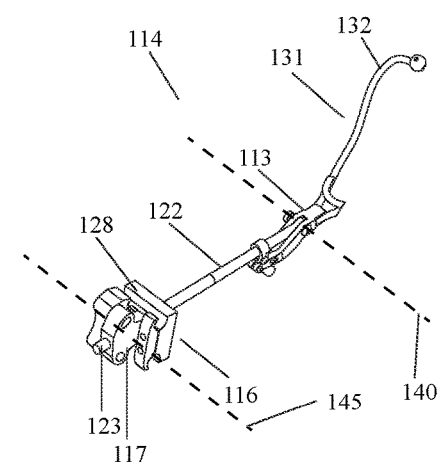
FIGS. 18D and 18E illustrate the single-arm version of the bracket in use with the brace.
Figure 18E:
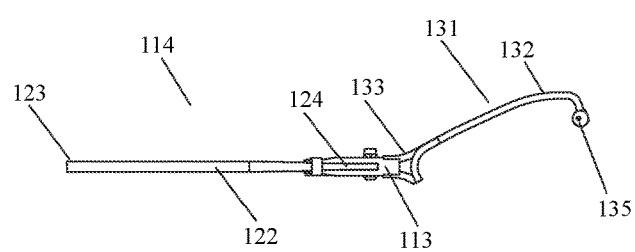
Figure 18F:
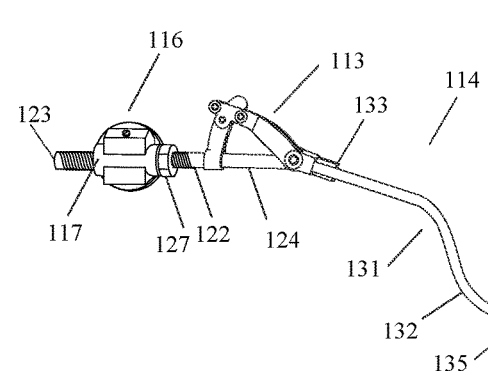
FIGS. 18F and 18G illustrate a front view and a top view respectively of yet another embodiment of the bracket.
Figure 18G:
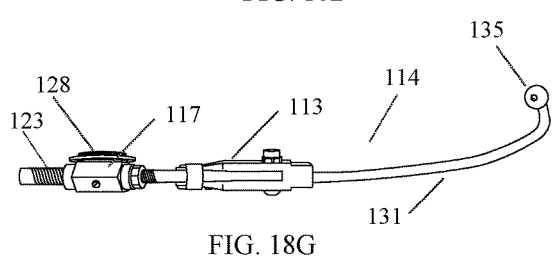
Figure 18H:
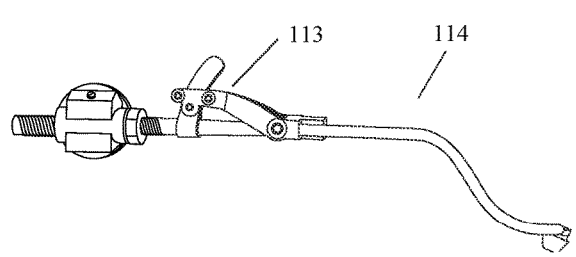
FIG. 18H shows the first bracket member and the second bracket member locked with a hinged joint at an angle different from that shown in FIG. 18F.
Figure 19A:
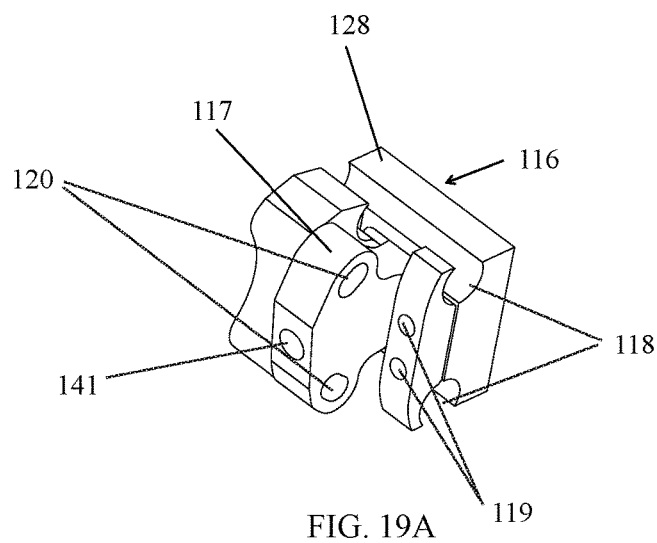
FIGS. 19A-19E show a perspective, a top, a front, a back and a side views, respectively of a clamp.
Figure 19B:
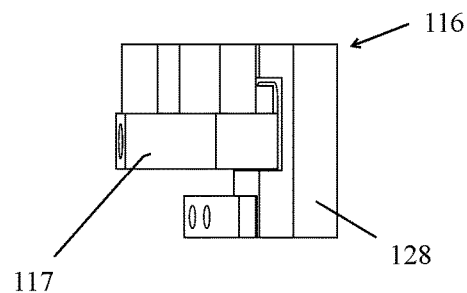
Figure 19C:
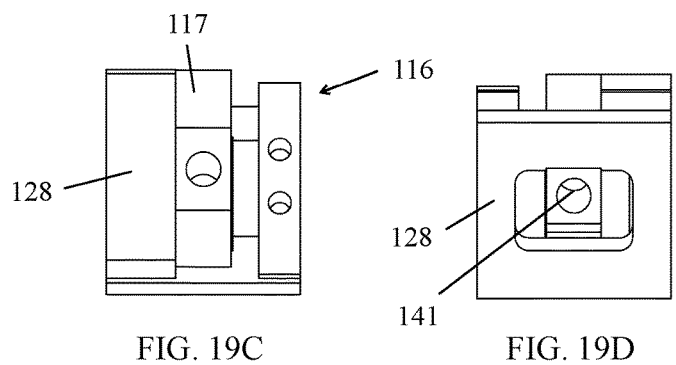
Figure 19D:
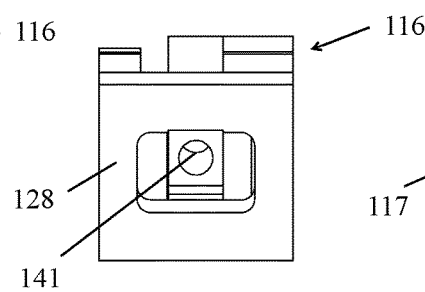
Figure 19E:
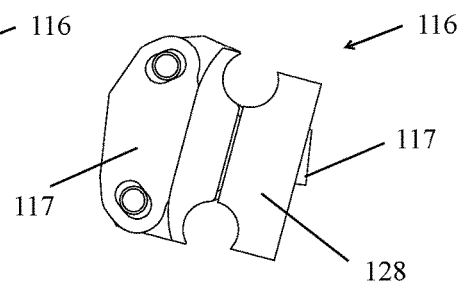

Referring to FIGS. 15A-15E, 16A-16F and 17A-17D, according to one embodiment, the anchorage assembly (200) includes a screw end (201) configured to be fastened to any section of the skull (107) (for example, anchored to the rear section 109 as shown in FIG. 12B), an opposite free end (202) spaced apart by a selectable distance with an abutment (203) and a plate assembly (204) configured to rotatably couple the free end (202) to the rear brace segment (105). The screw end (201) is paired with the abutment (203) via an internal screw (205) as shown in FIG. 16E. The abutment (203) is connected to the rotatable plate/free end (202) held in place by a second internal screw (206), which is tightened at its head (208). Slots 207A and 207B enable the free end (202) to be adjustably mounted to the abutment (203) at a desired orientation. An abutment (203) of desired length can be used to get the required spacing between the screw end (201) and the free end (202) that protrudes from the skull. The rotatable plate/free end (202) rotatably rests within a metal bracket/pocket (701) defined by the plate assembly (204) comprising of two metal plates as shown in FIG. 17C. The plate assembly (204) is in turn mounted to the rear brace section (105) as illustrated in FIGS. 13A-13C and 14A-14B.

The free end (202) is the connection point between the user's skull and the brace (102), and it is adjustable such that it can be rotated and angulated to match the tangential angle of the skull at the point of screw end's (201) penetration.

The free end (202) is configured to serve as a proxy surface between the brace (102) and the user's skin, such that the brace (102) never has to touch the user's skin, or exert any force against the skin, as the brace rests entirely upon the free end (202).

Reference to FIGS. 11A-11C, 13A-13C and 18A-18C, the dual-arm orthodontic bracket (114) comprises a first bracket member (122), a second bracket member (131) and a lockable hinge joint (113). The first bracket (122) has a proximal end (123) and an opposite distal end (124), and the second bracket member (131) comprises an anterior member (132) and a tail end (133). In accordance with one feature of the preferred embodiment, an inner end (135) of the anterior member (132) is adapted to be rotatably attached to an anterior portion of the skull (for example, to either or both the left and right side of a user's maxilla, or appropriate bony structure, inside the mouth) with the help of a fastener. The fastener, in one embodiment, is a ball-and-socket joint system (900) as shown in FIGS. 19A-19D.

The clamp (116), as shown in FIGS. 1A-1B, 11A-11E, 13A-13E, 19A-19E and 28A-28F, enables mounting of the bracket (114) to a mounting portion (129) of the brace (102). The first bracket member (122), at its proximal end (123), is attached to a mounting portion (129) of the brace (102) by the clamp (116). More specifically, the proximal end (123) is adjustably secured by the adjuster (127) to the receiving member (117) of the clamp (116) and the clamp (116) is selectively mounted to any section of the mounting portion (129) with the help of its clamp body (128). The rotating receiving member (117) has an opening (141) for the proximal end (123) of the first bracket member (122) to insert into. It also has grooves (118) for the brace (102) to fit into and screw openings (119) to tighten the clamp body (128) onto the brace (102). It also has two openings (120) for screws to adjust the angle of the receiving member (117).

Referring to FIGS. 18A-18C and 19A-19E, the opening (141) is configured to freely receive the proximal end (123) such that, when the adjuster (127) is turned in either direction, the proximal end (123) having threads thereupon is pulled or pushed through the opening (141) producing a translational movement of the first bracket member (122). The distal end (124) connects the first bracket member (122) to the second bracket member (131) at its tail end (133) by the hinge joint (113). The hinge joint (113) is configured to enable rotation of the first bracket member (122) about a second axis of rotation (140) with selective locking of the first bracket member (122) at various angles relative to the second bracket member (131). So, turning of the adjuster (127) pulls the bracket (114) through the opening (141), which then exerts a pulling force against the user's anterior portion (maxilla or other bony structure) to which the bracket (114) is anchored and another equal and opposite force on the skull to which the brace (102) is anchored.

The first bracket member (122) can be independently rotated in multiple directions at the lockable hinged joint (113) located outside the mouth as shown in FIGS. 11A-11C, including the up and down direction about the second axis of rotation (140), by unlocking the hinge and rotating the front half of the brace (104) at the brace's rotational joints (115) to adjust the pulling angle of the anterior portion of the skull (maxilla and other facial bones, for example) without disrupting the inner portion i.e. the second bracket member (131) of the bracket (114) and its position relative to the user's mouth that may have been previously determined by setting the angle of the ball and socket joints (900) about its longitudinal axis (901).

Referring to FIGS. 11A-11C, the receiving member (117) of the clamp (116) has a center of rotation about a third axis of rotation (145). The axis of rotation of the brace (139) is offset from the axis of rotation of the bracket (140) due to their differing lengths, and the changing distance of the bracket (114) as it advances with respect to the fixed brace (104). Therefore, rotation of the brace (104), in unison with the bracket (114), will result in rotation of the claim 116) around the third axis of rotation (145). Thus, rotation of the clamp (116) about its axis (145) allows rotation of the bracket to remain rotatably held to the brace (104).

The bracket (114) may also be adjusted from left to right, and it may be split into two or more separate brackets, such that one side or part of an anterior portion of a user's skull i.e. user's maxilla, or appropriate bony structure may be pulled independently from another part. In the case of more than one bracket (114) being used, each bracket (114) is designed to be independently connected to the front brace segment (104), through its own clamp (116), each held with its own adjuster (127) at the front of its receiving member (117). Whether the anterior member (132) of the second bracket member (131) has a pair of arms (in "Y" shape extending from the tail end (133) as shown in FIGS. 8A-8C, for example) or has only one arm (as shown in FIGS. 8D-8F, for example), in either case, the anterior member (132) is dimensioned to fit inside the mouth of the user in the case of the intra-oral version of the bracket (114) as shown in FIGS. 11A-11D, 12A-12D or to fit outside the mouth least partially over an anterior portion (160) of the skull, penetrating the skin of the user at an opening (2402) to access the point of anchorage as shown in FIGS. 25A-25D, 26A-26E, 27A-27B and 29A-29C.

Figure 27A:
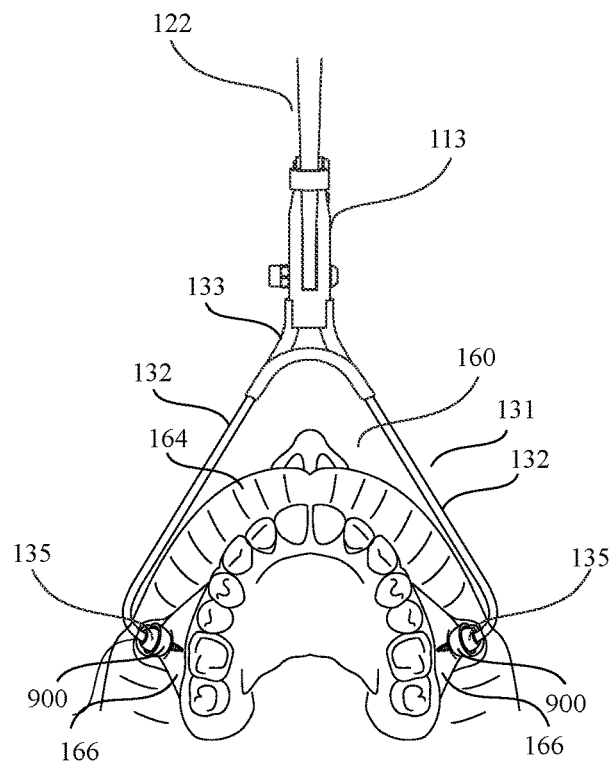
FIG. 27A illustrates anchoring of the inner ends of the double/dual arm second bracket member extra-orally.
Figure 27B:
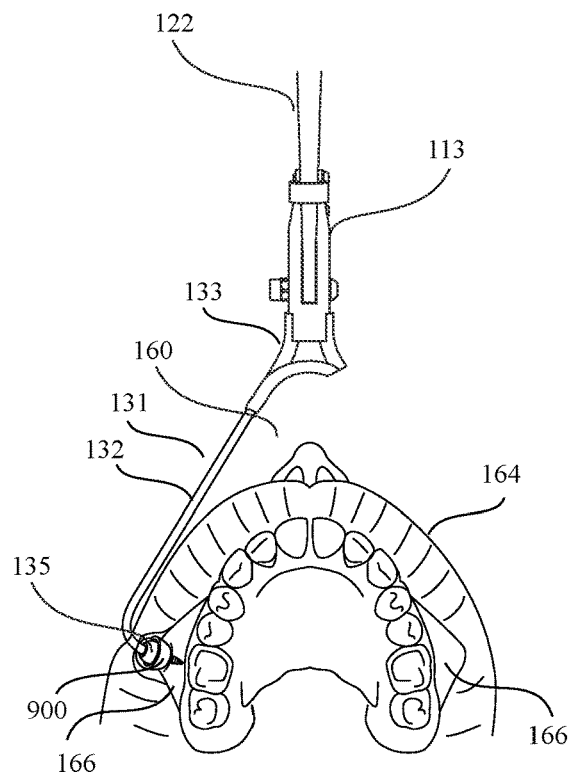
FIG. 27B illustrates anchoring of the inner ends of the single-arm second bracket member extra-orally.
Figure 28A:
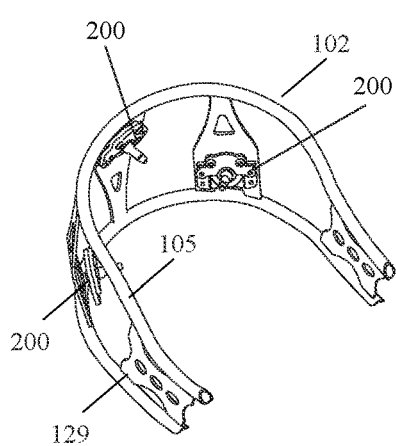
FIGS. 28A and 28B illustrate a perspective view and a top view of the brace comprising only the full-rear brace segment.
Figure 28B:
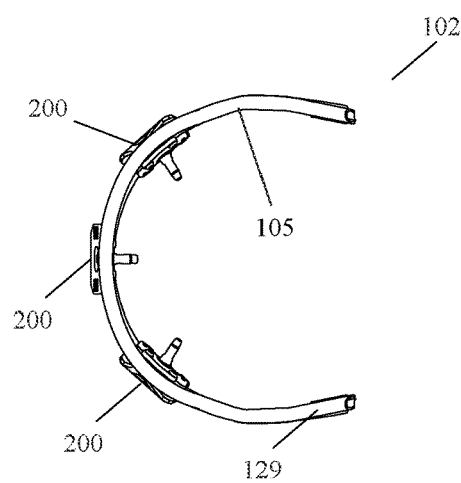
Figure 28C:
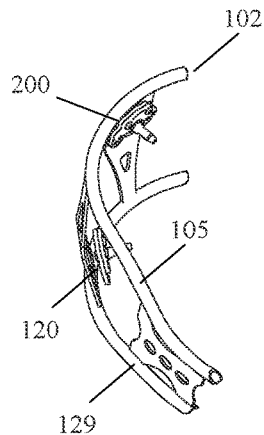
FIGS. 28C and 28D illustrate a perspective view and a top view of a a brace comprising a half-rear brace segment.
Figure 28D:
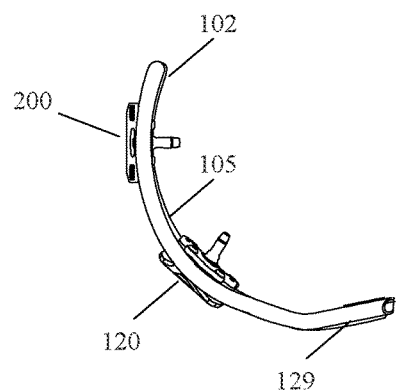
Figure 28E:
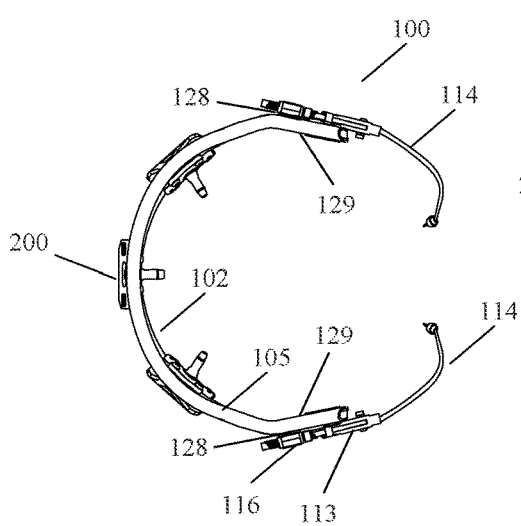
FIG. 28E illustrates a top view of the full-rear brace segment with two extra oral brackets.
Figure 28F:
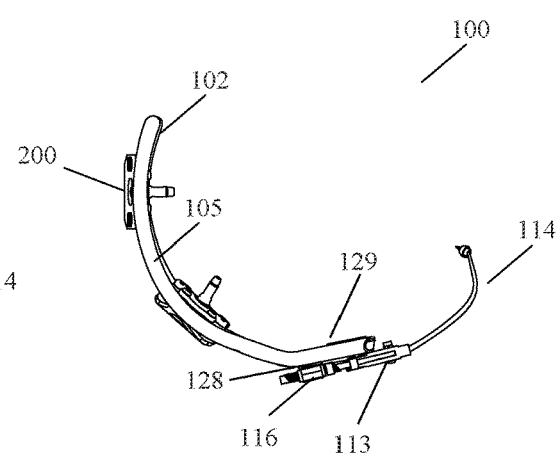
FIG. 28F illustrates a top view of a half-rear brace segment with one extra oral bracket.
Figure 29A:
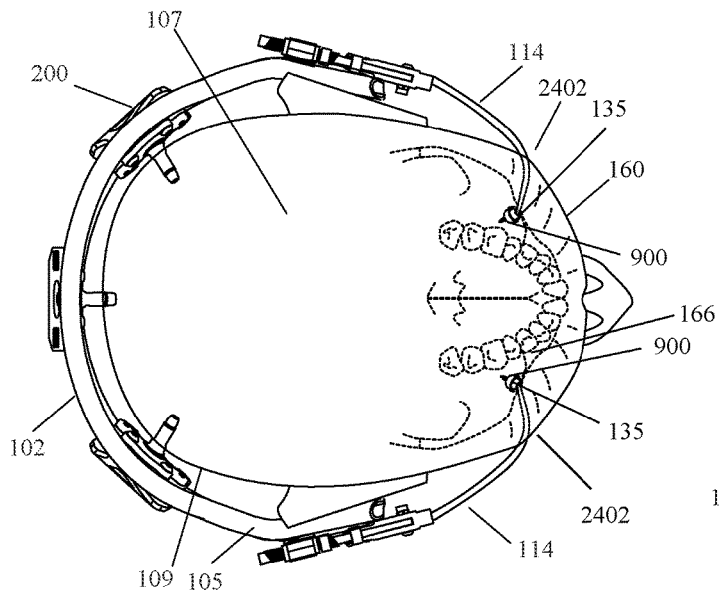
FIG. 29A illustrates a bottom view of the full-rear brace segment with two extra oral brackets in use.
Figure 29B:
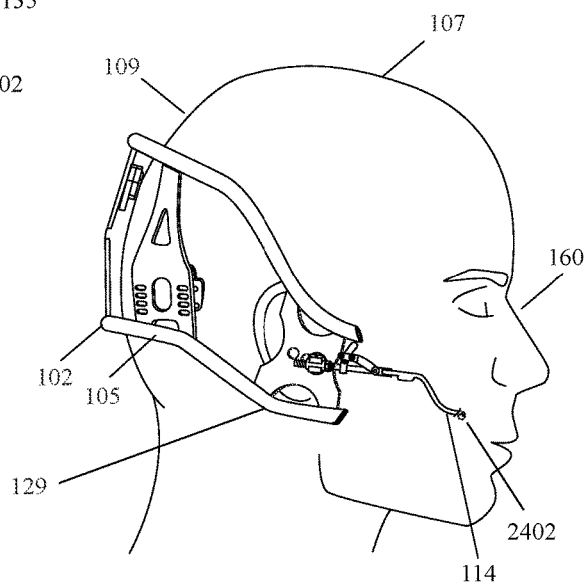
FIG. 29B illustrates a side view of the full-rear brace segment with two extra oral brackets in use.
Figure 29C:
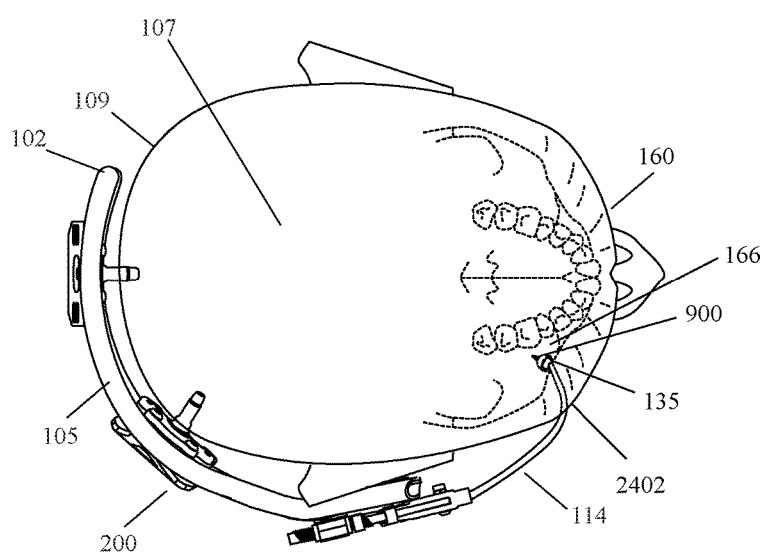
FIG. 29C illustrates a bottom view of the half-rear brace segment with a single extra oral bracket in use.

FIGS. 27A and 27B further illustrate how the anterior member(s) (132) of the single-arm and dual-arm versions of the extra-oral second bracket member (131) are configured for anchorage to an anterior skull portion (the bony structure of the maxilla, zygoma, or temporal bone, for example) with ball-and-socket joint type of fasteners (900) when the bracket (114) is mounted to the front brace segment (104) as shown in FIGS. 25A-25D. FIGS. 29A-29C illustrate anchoring of similar extra-oral bracket (114) to an anterior skull portion (160), such as to the bony structure (166) of upper jaw, when the bracket (114) is mounted directly to a mounting portion (129) of the full or half rear brace segment (105). The term "anterior portion/region (160)" is used herein to refer to any section of the frontal and mid sections of the skull including upper and lower teeth/jaws, zygomatic, sphenoid, frontal, parietal and temporal bone of the skull etc.

Figure 31A:
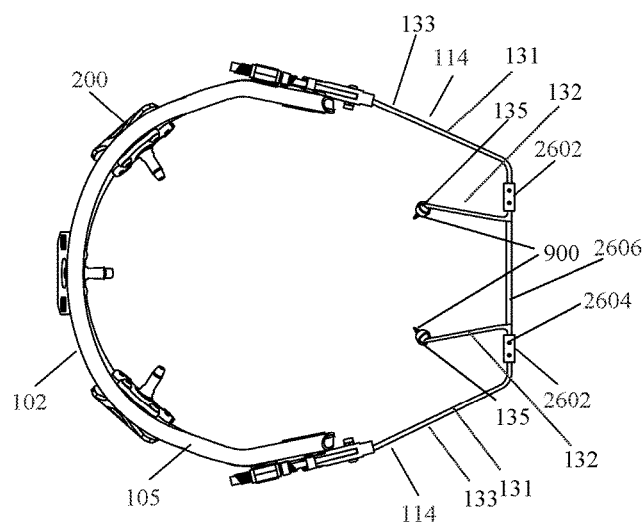
FIG. 31A illustrates a top view of the device having a full-rear brace segment coupled to two one-arm intra-oral brackets.
Figure 31B:
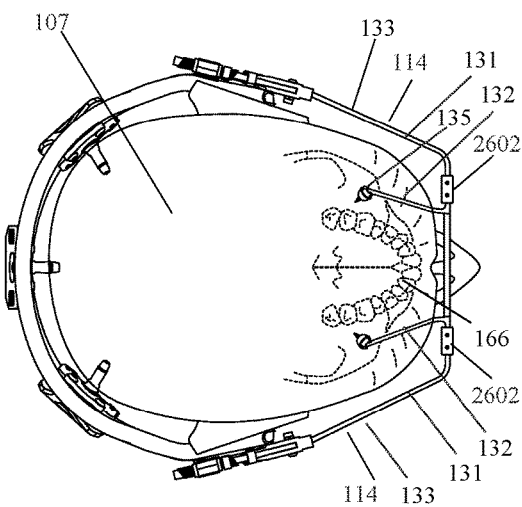
FIG. 31B illustrates a bottom view of the device having a full-rear brace segment coupled to two one-arm intra-oral brackets in use.
Figure 31C:
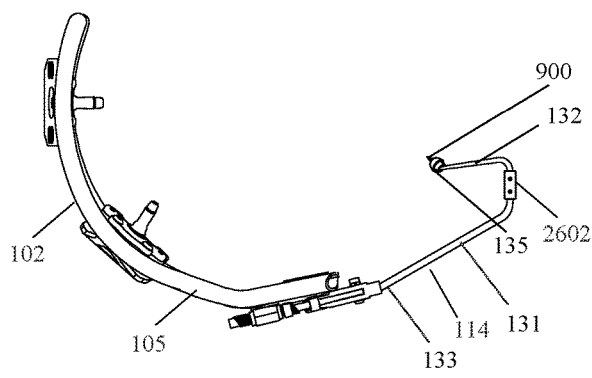
FIG. 31C illustrates a top view of the device having a half-rear brace segment coupled to a one-arm intra-oral brackets.
Figure 31D:
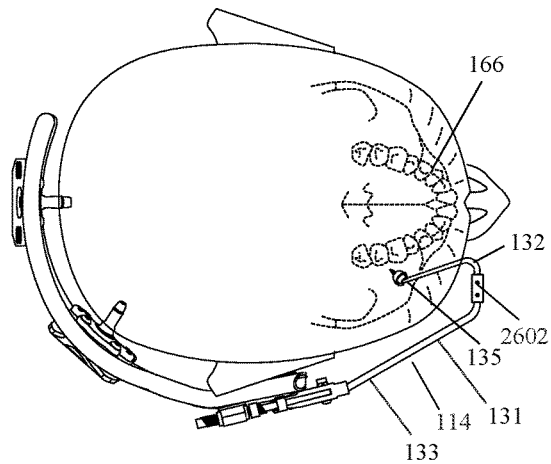
FIG. 31D illustrates a bottom view of the device having a half-rear brace segment coupled to a one-arm intra-oral brackets in use.

In another embodiment, as shown in FIGS. 31A-31D and 32A-32D, the second bracket member (131) further comprises one or more couplers (2602) disposed between the tail end (133) and the anterior member (132). The one or more couplers (2602) are configured to enable selective locking engagement of the anterior member (132) in adjustable relation to the tail end (133). For example, the anterior member (132) can be adjusted or twisted/turned and locked by engaging screws (2604) at different positions with respect to the tail end (133) as per requirement. In some embodiments, as shown in FIGS. 31A-31B, the anterior member (132) may further comprise a bridging element (2606) which rigidly couples both the brackets (114) over the anterior portion (160) of the skull (107).

FIG. 31B illustrates the rear segment brace (105) anchored to the skull (107) and the dual brackets (114) anchored intra-orally to the anterior portion (160), such as to the bony structure (166) of upper jaw, with the help of ball-and-socket joint type fasteners (900). FIG. 31D illustrates similar anchoring for the device (100) having a half rear brace segment (105) with one intra-oral bracket (114).

Figure 24A:
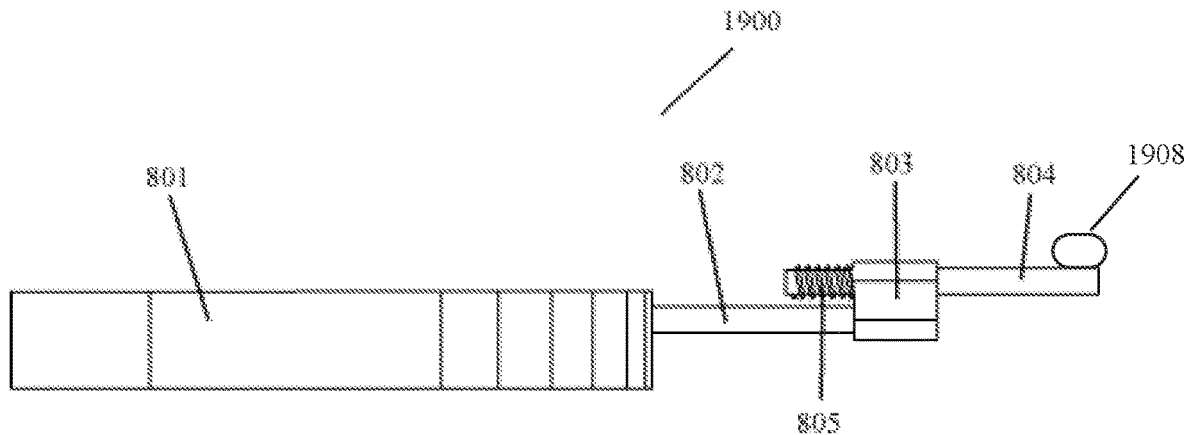
FIGS. 24A-24C show two side views and a top view of a concomitant mouthpiece/orthodontic appliance.
Figure 24B:
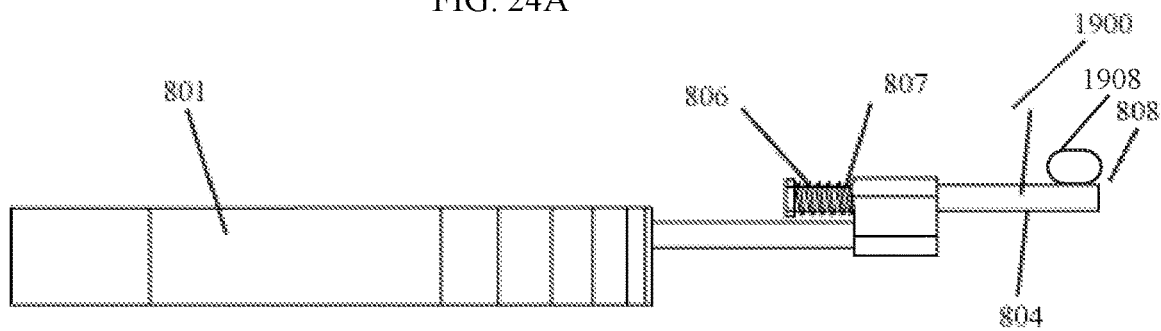
Figure 24C:
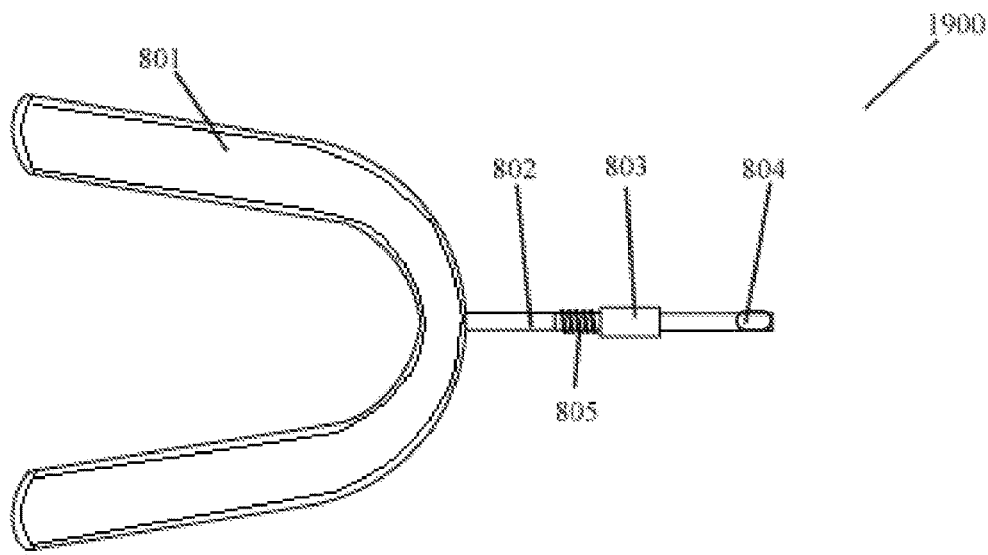

The appliance (100) further comprises a concomitant mouthpiece (1900), as shown in FIGS. 24A-24C, which is another form of fastener designed to be temporarily worn onto an anterior bony structure of said skull (teeth of the lower jaw, for example). The concomitant mouthpiece type fastener (1900) comprises an orthodontic bracket (801) configured to be removably fitted over the anterior bony structure (teeth of the lower jaw in this example) and a linkage having an elongated first member (802) connected to the orthodontic bracket (801) at one end, a sleeve (803) disposed at the other end of the first elongated member (802) and a second elongated member (804) configured to be received via a screw thread (805) by the sleeve (803). A bolt (806) rests upon the screw thread (805) and can be turned to advance the mouthpiece (801) in the anterior direction, thus advancing the mandible to open the user's airway. A compression spring (807) is mounted over the second elongated member (804) between the sleeve (803) and a bolt head (806) disposed at the orthodontic bracket (801) facing side of the second elongated member (804) in such a way that the second elongated member (804) is biased toward the orthodontic bracket (801). As showed in FIGS. 32A, 32B, 32A and 32B, the distal end (808) of the second elongated member (804) is coupled to the inner end (135) of the anterior member (132) through the socket (1908). The bolt head (806) can be turned to advance the sleeve (803) in the anterior direction, which will advance the first elongated member (802) connected to the mouthpiece (801) in the anterior direction, hence advancing the mouthpiece (801) in the anterior direction, with the purpose of anchoring the lower jaw in a forward position relative to both the brace (102) and the user's airway, to keep the user's airway open.

FIGS. 20A-20C, 21A-21B, 22A-22C and 23A-23B illustrate an embodiment (1500) of the device (100) in which the brace (102) may be split into left or right halves in such a way that the brace at the front extends only partially over both the anterior and posterior regions/portions of the skull of the user sufficiently enough for anchoring to the rear section (109) of the skull (107) of the user. This embodiment of the device (100) enables the user to wear one half of the appliance on one half of their skull, while they sleep on the other side.

The half side of the brace (702) configured to be worn during sleep may have removable structural reinforcements (703) that can be attached to it, allowing it to have the same stiffness and structural integrity as the brace that is not split into a right or left half.

In all of the aforementioned embodiments, due to rotation of the adjustable center screw (127), the orthodontic bracket (114) is displaced with respect to the brace (102) which results in generation of a first force (148), as shown in FIG. 1B, in a first direction on the anterior portion i.e. bony structure of the skull to which the bracket (114) is anchored through the fastener. This results in generation of a second force (150) in a second direction opposite to the first direction which is transmitted to the cranial anchorage assemblies (200) through the brace (102). Gradual application of displacement force, at regular interval, causes expansion and osteogenesis at cranial sutures.

The device disclosed herein may be embodied in other specific forms without departing from their essential characteristics. The described embodiments are in all respects illustrative and not restrictive. The scope of the invention is, therefore, indicated by the appended claims rather than the foregoing description. All changes within the meaning and range of equivalency of the claims are to be embraced within their scope.

To the extent not already described, the different features and structures of the various embodiments can be used in combination, or in substitution with each other. That one feature is not shown in all the embodiments is not meant to be construed that it cannot be so shown but is done for brevity of description. Thus, the various features of the different embodiments can be mixed and matched to form new embodiments, whether the new embodiments are expressly described. All combinations or permutations of features described herein are covered by this disclosure.

What is claimed is:

1. A dentofacial orthopedic device comprising:
   a. a brace configured to be anchored to a skull of a user with one or more cranial anchorage assemblies; and
      at least one bracket comprising:
         a first bracket member having a proximal end and a distal end, said proximal end being adjustably secured by an adjuster to a receiving member of a clamp having a clamp body selectively mounted to any section of a mounting portion of said brace; and a second bracket member having a tail end coupled to said distal end of said first bracket member by a joint, and an anterior member having an inner end configured to be rotatably anchored to an anterior portion of said skull of said user by at least one fastener, said first bracket member being movable about said receiving member for a selective locking of said first bracket member at a plurality of angular positions relative to said brace;

wherein an actuation of said adjuster at any of said plurality of angular positions is configured to cause a displacement of said bracket with respect to said brace to exert a first force on said an anterior portion of said skull through said at least one fastener in a first direction and a second force in a second direction opposite to said first force on said skull through said one or more cranial anchorage assemblies.

2. The dentofacial orthopedic device as claimed in claim 1, wherein said brace comprises at least one front brace segment and at least one rear brace segment hingedly connected to said at least one front brace segment by a rotating joint, said at least one front brace segment being configured to extend at least partially over said anterior portion of said skull when said at least one rear brace segment is anchored to said skull.

3. The dentofacial orthopedic device as claimed in claim 1, wherein said brace is a full-brace or a half-brace.

4. The dentofacial orthopedic device as claimed in claim 3, wherein said full-brace being configured to extend over an entire periphery of said skull and said half-brace being configured to extend partially over said skull.

5. The dentofacial orthopedic device as claimed in claim 3, wherein said full-brace and said half-brace are configured to be a single-piece or a multi-segment.

6. The dentofacial orthopedic device as claimed in claim 1, wherein said brace adapted to provide a space between said brace and said skull to removably accommodate one or more cushioning pads.

7. The dentofacial orthopedic device as claimed in claim 1, wherein said brace is further configured to accommodate a helmet to be worn at least over a portion of said brace.

8. The dentofacial orthopedic device as claimed in claim 1, wherein a first anchorage screw comprising a screw body having a groove and a sliding locking bracket flexibly connects said inner end of said anterior member to said at least one fastener.

9. A dentofacial orthopedic device comprising:
a brace configured to be anchored to a skull of a user with one or more cranial anchorage assemblies; and
at least one bracket, said at least one bracket comprising:
a first bracket member having a proximal end and a distal end, said proximal end being adjustably secured by an adjuster to a receiving member of a clamp having a clamp body selectively mounted to any section of a mounting portion of said brace; and
a second bracket member having a tail end hingedly connected to said distal end of said first bracket member by a hinge joint, and an anterior member having an inner end configured to be rotatably anchored to an anterior portion of said skull of said user by at least one fastener, said first bracket member being rotatable about said receiving member for a selective locking of said first bracket member at a plurality of angular positions relative to said second bracket member with said hinge joint;

wherein an actuation of said adjuster at any of said plurality of angular positions of said first bracket member is configured to cause a displacement of said at least one bracket with respect to said brace to exert a first force on said anterior portion of said skull through said at least one fastener in a first direction and a second force in a second direction opposite to said first force on said skull through said one or more cranial anchorage assemblies.

10. The dentofacial orthopedic device of claim 9, wherein said brace comprises at least one front brace segment and at least one rear brace segment hingedly connected to said at least one front brace segment by a rotating joint, said at least one front brace segment being configured to extend at least partially over said anterior portion of said skull when said at least one rear brace segment is anchored to said skull.

11. The dentofacial orthopedic device of claim 9, wherein said second bracket member further comprises a coupler between said tail end and said anterior member, said coupler being configured to enable selective locking engagement of said anterior member in adjustable relation to said tail end.

12. The dentofacial orthopedic device of claim 9, wherein said anterior member of said second bracket member is a single arm or a pair of arms dimensioned for said anchoring of said inner end to said anterior portion intra-orally or extra-orally.

13. The dentofacial orthopedic device of claim 9, wherein said at least one fastener is a ball and socket system comprising a fastener end configured to be implantable in said anterior portion of said skull and a socket configured to rotatably receive said inner end of said anterior member.

14. The dentofacial orthopedic device of claim 9, wherein said at least one fastener is an orthodontic appliance comprising an orthodontic bracket configured to be removably fitted over said anterior portion of said skull of said user and a linkage configured to pivotally and/or adjustably connect said orthodontic bracket to said inner end of said anterior member, said anterior portion of said skull being teeth or a dental arch of said user.

15. The dentofacial orthopedic device of claim 9, wherein each of said one or more cranial anchorage assemblies comprises a screw end configured to be fastened to said skull, an opposite free end spaced apart by a selectable distance with an abutment and a plate assembly configured to rotatably couple said free end to said brace, said free end being configured to be adjustably mounted to said abutment at a desired orientation.

16. A method for midfacial advancement, said method comprising:
mounting, selectively, a clamp body of a clamp to any section of a mounting portion of a brace;
providing a bracket having a first bracket member and a second bracket member comprising an anterior member and a tail end, said first bracket member having a proximal end adjustably secured by an adjuster to a receiving member of said clamp and a distal end hingedly connected to said tail end of said second bracket member by a hinge joint such that said first bracket member is rotatable about said receiving member for a selective locking of said first bracket member at a plurality of angular positions relative to said second bracket member with said hinge joint;
anchoring, rotatably, an inner end of said anterior member to an anterior portion of said skull by at least one fastener;

locking said first bracket member at a selected angular position of said plurality of angular positions relative to said second bracket member with said hinge joint;

actuating said adjuster at said selected angular position to cause a displacement of said bracket with respect to said brace to exert a first force on said anterior portion through said at least one fastener in a first direction and a second force in a second direction opposite to said first force on said skull through said one or more cranial anchorage assemblies.

17. The method of claim 16, wherein said brace comprises at least one front brace segment and at least one rear brace segment hingedly connected to said at least one front brace segment by a rotating joint, said at least one front brace segment being configured to extend at least partially over said anterior portion of said skull when said at least one rear brace segment is anchored to said skull.

18. The method of claim 16, wherein said at least one fastener is a ball and socket system comprising a fastener end configured to be implantable in said anterior portion of said skull and a socket configured to rotatably receive said inner end of said anterior member.

19. The method of claim 16, wherein each of said one or more cranial anchorage assemblies comprises a screw end configured to be fastened to said skull, an opposite free end spaced apart by a selectable distance with an abutment and a plate assembly configured to rotatably couple said free end to said brace, said free end being configured to be adjustably mounted to said abutment at a desired orientation.

20. The method of claim 16, wherein said at least one fastener is an orthodontic appliance comprising an orthodontic bracket configured to be removably fitted over said anterior portion of said skull of said user and a linkage configured to pivotally and/or adjustably connect said orthodontic bracket to said inner end of said anterior member, said anterior portion of said skull being teeth or a dental arch of said user.

* * * * *